US012650752B2

(12) United States Patent (10) Patent No.: US 12,650,752 B2
Sakai et al. (45) Date of Patent: Jun. 9, 2026

(54) INFORMATION PROCESSING APPARATUS AND INFORMATION PROCESSING METHOD FOR USERS AT REMOTE LOCATIONS TO COMMUNICATE NATURALLY

(71) Applicant: SONY GROUP CORPORATION, Tokyo (JP)

(72) Inventors: Yusuke Sakai, Tokyo (JP); Masanori Seto, Kochi (JP)

(73) Assignee: SONY GROUP CORPORATION, Tokyo (JP)

( * ) Notice: Subject to any disclaimer, the term of this patent is extended or adjusted under 35 U.S.C. 154(b) by 1045 days.

(21) Appl. No.: 17/756,127

(22) PCT Filed: Nov. 13, 2020

(86) PCT No.: PCT/JP2020/042374
§ 371 (c)(1),
(2) Date: May 18, 2022

(87) PCT Pub. No.: WO2021/106610
PCT Pub. Date: Jun. 3, 2021

(65) Prior Publication Data
US 2023/0341987 A1 Oct. 26, 2023

(30) Foreign Application Priority Data
Nov. 28, 2019 (JP) ................................. 2019-215559

(51) Int. Cl.
*G06F 3/0481* (2022.01)
*G06T 7/70* (2017.01)
*H04N 7/14* (2006.01)

(52) U.S. Cl.
CPC .............. *G06F 3/0481* (2013.01); *G06T 7/70* (2017.01); *H04N 7/141* (2013.01)

(58) Field of Classification Search
None
See application file for complete search history.

(56) References Cited

U.S. PATENT DOCUMENTS 10,375,353 B2 * 8/2019 Sakai ..................... H04N 7/147
10,511,807 B2 * 12/2019 Sakai ..................... H04N 7/157
(Continued)

FOREIGN PATENT DOCUMENTS

JP 2010-016669 A 1/2010
JP 2012-079167 A 4/2012
(Continued)

OTHER PUBLICATIONS

International Search Report and Written Opinion of PCT Application No. PCT/JP2020/042374, issued on Feb. 2, 2021, 09 pages of ISRWO.

*Primary Examiner* — Maikhanh Nguyen
(74) *Attorney, Agent, or Firm* — CHIP LAW GROUP

(57) ABSTRACT

Provided is an information processing apparatus that includes a control unit. When a captured image, captured by an imaging device in one space, is displayed in real time by a display device in another space between a first space in which a first imaging device and a first display device are installed and a second space in which a second imaging device and a second display device are installed, the control unit acquires analysis target data obtained from a device installed in at least one of the first space or the second space, analyzes a state of a user by using the acquired analysis target data on the basis of a human visual characteristic, and controls a shape of a display area of the display device on the basis of an analysis result of the state of the user.

20 Claims, 23 Drawing Sheets

(56) References Cited

U.S. PATENT DOCUMENTS

| | | | | |
|---|---|---|---|---|
| 10,638,091 | B2 * | 4/2020 | Izumihara | G10L 25/63 |
| 10,785,447 | B2 * | 9/2020 | Sakai | H04M 11/00 |
| 2013/0257720 | A1 * | 10/2013 | Noda | G06V 40/28 |
| | | | | 345/157 |
| 2014/0225919 | A1 * | 8/2014 | Kaino | H04N 7/183 |
| | | | | 345/633 |
| 2017/0235975 | A1 | 8/2017 | Iwanami et al. | |
| 2018/0203233 | A1 * | 7/2018 | Tsukahara | G06F 3/011 |
| 2018/0332254 | A1 * | 11/2018 | Sakai | H04N 7/15 |
| 2018/0352193 | A1 * | 12/2018 | Sakai | H04M 11/00 |
| 2019/0327446 | A1 * | 10/2019 | Sakai | H04N 7/157 |

FOREIGN PATENT DOCUMENTS

| | | | |
|---|---|---|---|
| WO | 2016/072118 | A1 | 5/2016 |
| WO | WO-2017098780 | A1 | 6/2017 |

* cited by examiner

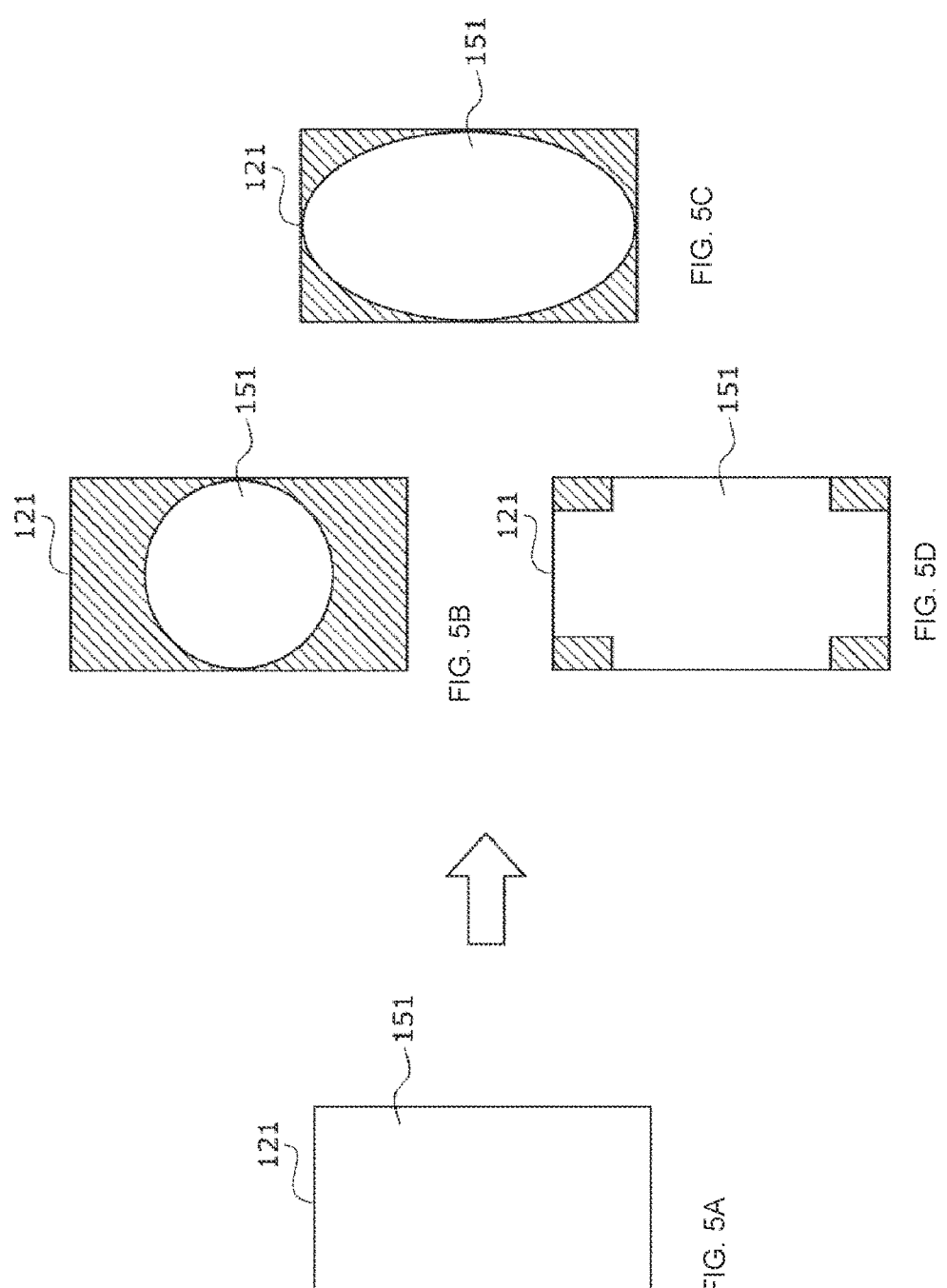

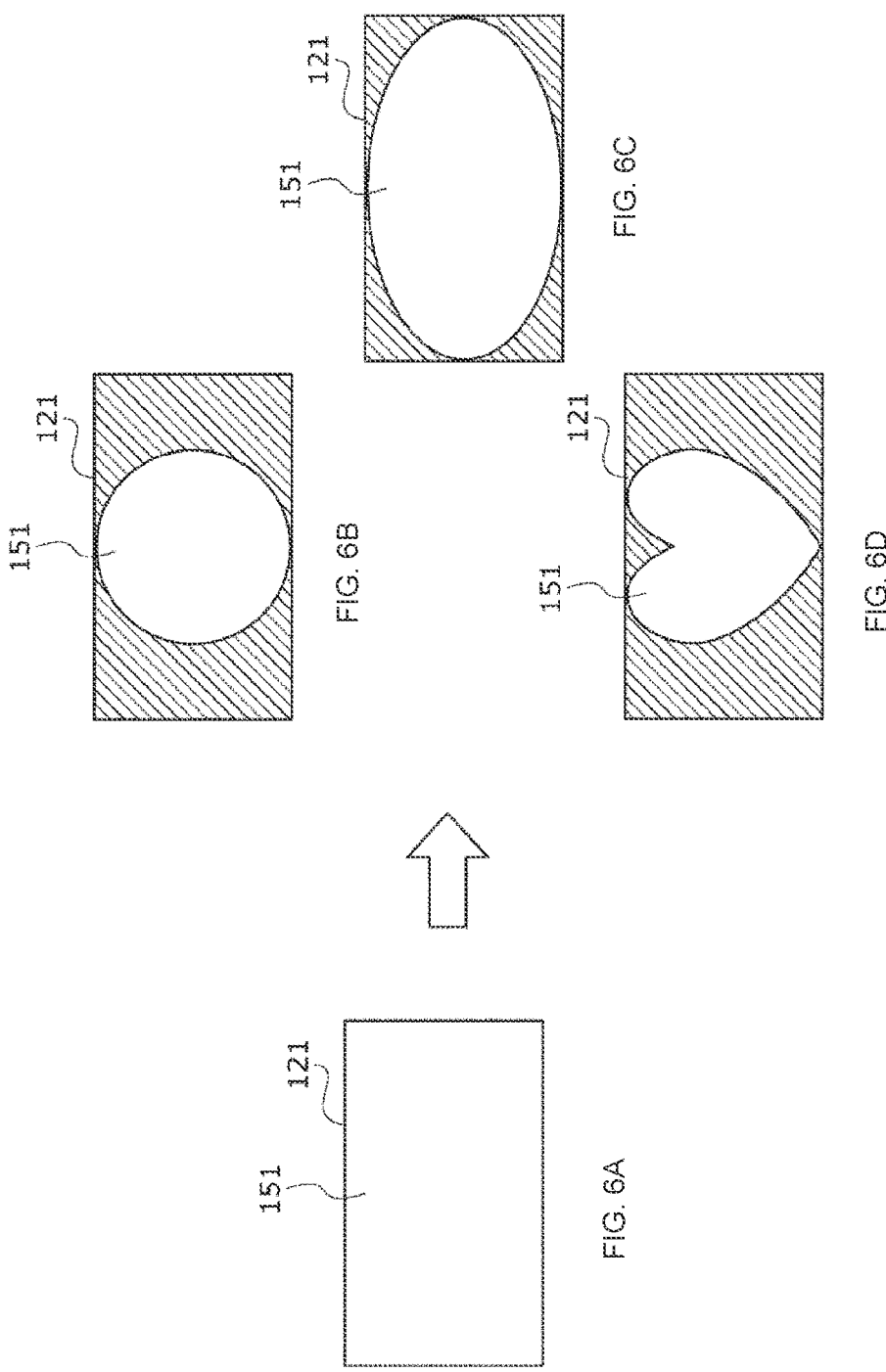

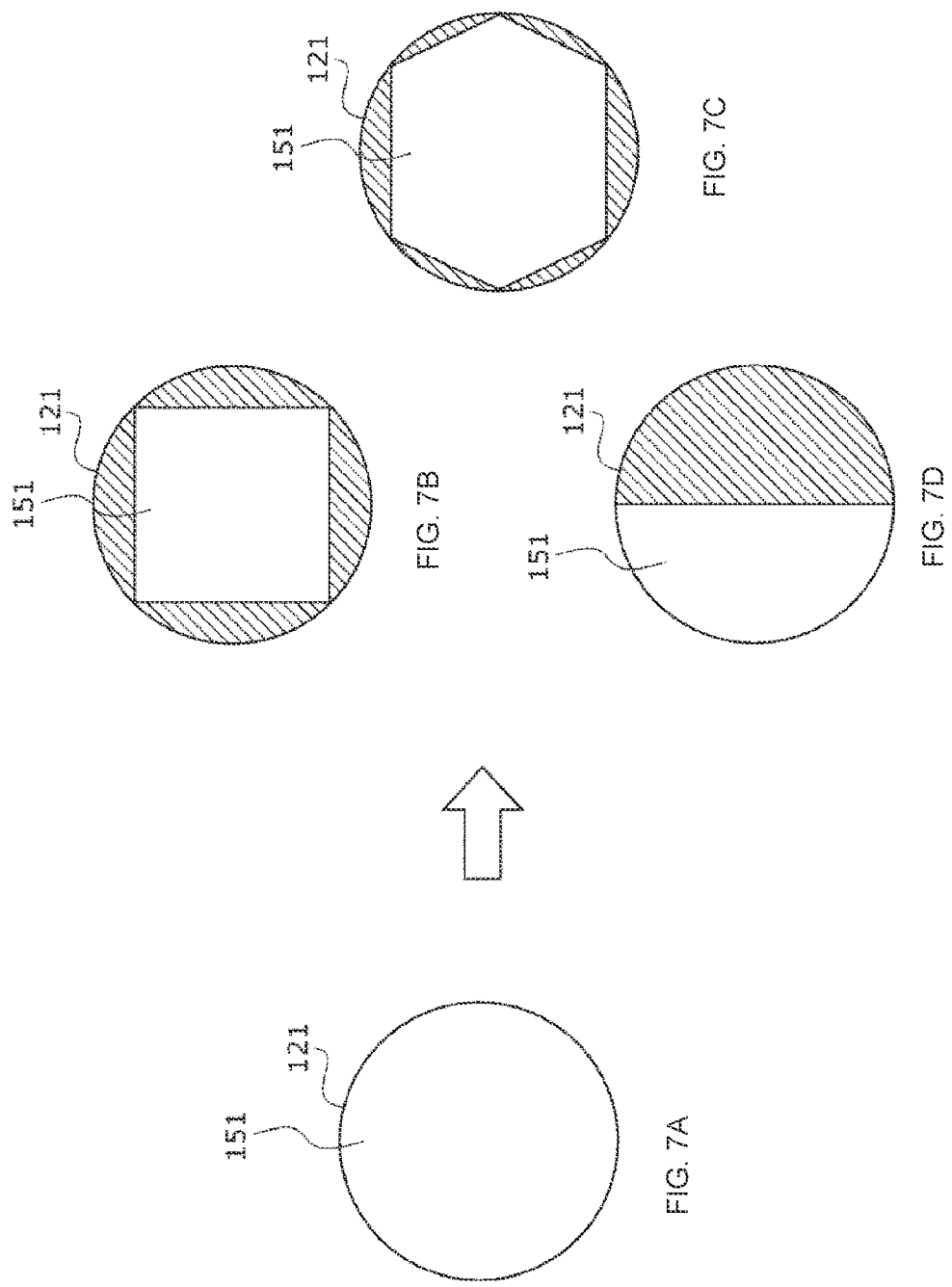

a: DISCRIMINATIVE FIELD OF VIEW
b: EFFECTIVE FIELD OF VIEW
c: GAZE STABLE FIELD OF VIEW
d: INDUCED FIELD OF VIEW
e: AUXILIARY FIELD OF VIEW

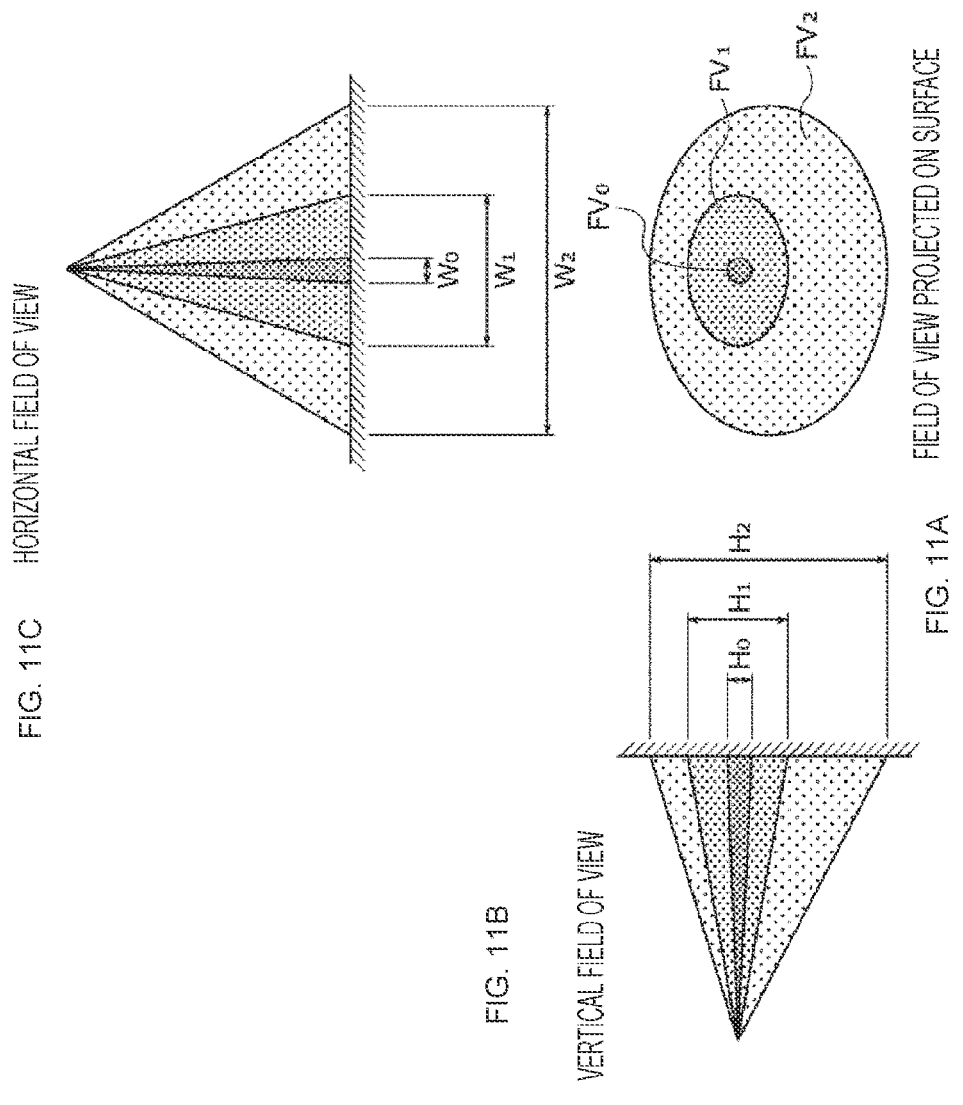
FIG. 11C    HORIZONTAL FIELD OF VIEW
FIG. 11A    FIELD OF VIEW PROJECTED ON SURFACE
FIG. 11B    VERTICAL FIELD OF VIEW

INFORMATION PROCESSING APPARATUS AND INFORMATION PROCESSING METHOD FOR USERS AT REMOTE LOCATIONS TO COMMUNICATE NATURALLY

CROSS REFERENCE TO RELATED APPLICATIONS

This application is a U.S. National Phase of International Patent Application No. PCT/JP2020/042374 filed on Nov. 13, 2020, which claims priority benefit of Japanese Patent Application No. JP 2019-215559 filed in the Japan Patent Office on Nov. 28, 2019. Each of the above-referenced applications is hereby incorporated herein by reference in its entirety.

TECHNICAL FIELD

The present technology relates to an information processing apparatus and an information processing method, and more particularly to an information processing apparatus and an information processing method that enable users at remote locations to more naturally communicate with each other.

BACKGROUND ART

Conventionally, using a video communication system, users at remote locations can have a conversation with each other while looking at each other, and can achieve closer communication.

As a technique related to the video communication system, for example, a technique disclosed in Patent Document 1 is known. In Patent Document 1, a user in one space can point to an arbitrary position with respect to a user in another space, and performs communication.

CITATION LIST

Patent Document

Patent Document 1: Japanese Patent Application Laid-Open No. 2012-79167

SUMMARY OF THE INVENTION

Problems to be Solved by the Invention

Meanwhile, if users at remote locations communicate with each other using a video communication system, it is required to enable more natural communication.

The present technology has been made in view of such a situation, and enables users at remote locations to more naturally communicate with each other.

Solutions to Problems

An information processing apparatus according to one aspect of the present technology is an information processing apparatus including: a control unit, in which when a captured image captured by an imaging device in one space is displayed in real time by a display device in another space between a first space in which a first imaging device and a first display device are installed and a second space in which a second imaging device and a second display device are installed, the control unit acquires analysis target data obtained from a device installed in at least one of the first space or the second space, analyzes a state of a user by using the acquired analysis target data on the basis of a human visual characteristic, and controls a shape of a display area of the display device on the basis of an analysis result of the state of the user.

An information processing method according to one aspect of the present technology is an information processing method in which when an information processing apparatus displays a captured image captured by an imaging device in one space in real time by a display device in another space between a first space in which a first imaging device and a first display device are installed and a second space in which a second imaging device and a second display device are installed, the method including: acquiring analysis target data obtained from a device installed in at least one of the first space or the second space; analyzing a state of a user by using the acquired analysis target data on the basis of a human visual characteristic; and controlling a shape of a display area of the display device on the basis of an analysis result of the state of the user.

In an information processing apparatus and an information processing method according to one aspect of the present technology, when a captured image captured by an imaging device in one space is displayed in real time by a display device in another space between a first space in which a first imaging device and a first display device are installed and a second space in which a second imaging device and a second display device are installed, analysis target data obtained from a device installed in at least one of the first space or the second space is acquired, a state of a user is analyzed by using the acquired analysis target data on the basis of a human visual characteristic, and a shape of a display area of the display device is controlled on the basis of an analysis result of the state of the user.

The information processing apparatus according to one aspect of the present technology may be an independent apparatus or an internal block constituting one apparatus.

BRIEF DESCRIPTION OF DRAWINGS

FIG. 2 is a diagram illustrating an example of a configuration of an information processing apparatus of FIG. 1.

FIGS. 5A, 5B, 5C, and 5D are diagrams illustrating a first example of the shape of the display area.

FIGS. 6A, 6B, 6C, and 6D are diagrams illustrating a second example of the shape of the display area.

FIGS. 7A, 7B, 7C, and 7D are diagrams illustrating a third example of the shape of the display area.

FIGS. 11A, 11B, and 11C are diagrams illustrating a relationship between a discriminative field of view, an effective field of view, and a gaze stable field of view.

FIG. 23 is a diagram illustrating still another example of the configuration of the embodiment of the information processing system to which the present technology is applied.

MODE FOR CARRYING OUT THE INVENTION

Hereinafter, an embodiment of the present technology will be described with reference to the drawings. Note that the description will be given in the following order.

1. Embodiment of Present Technology
2. Modified Examples
3. Configuration of Computer

1. Embodiment of Present Technology (Configuration of System)

Figure 1:
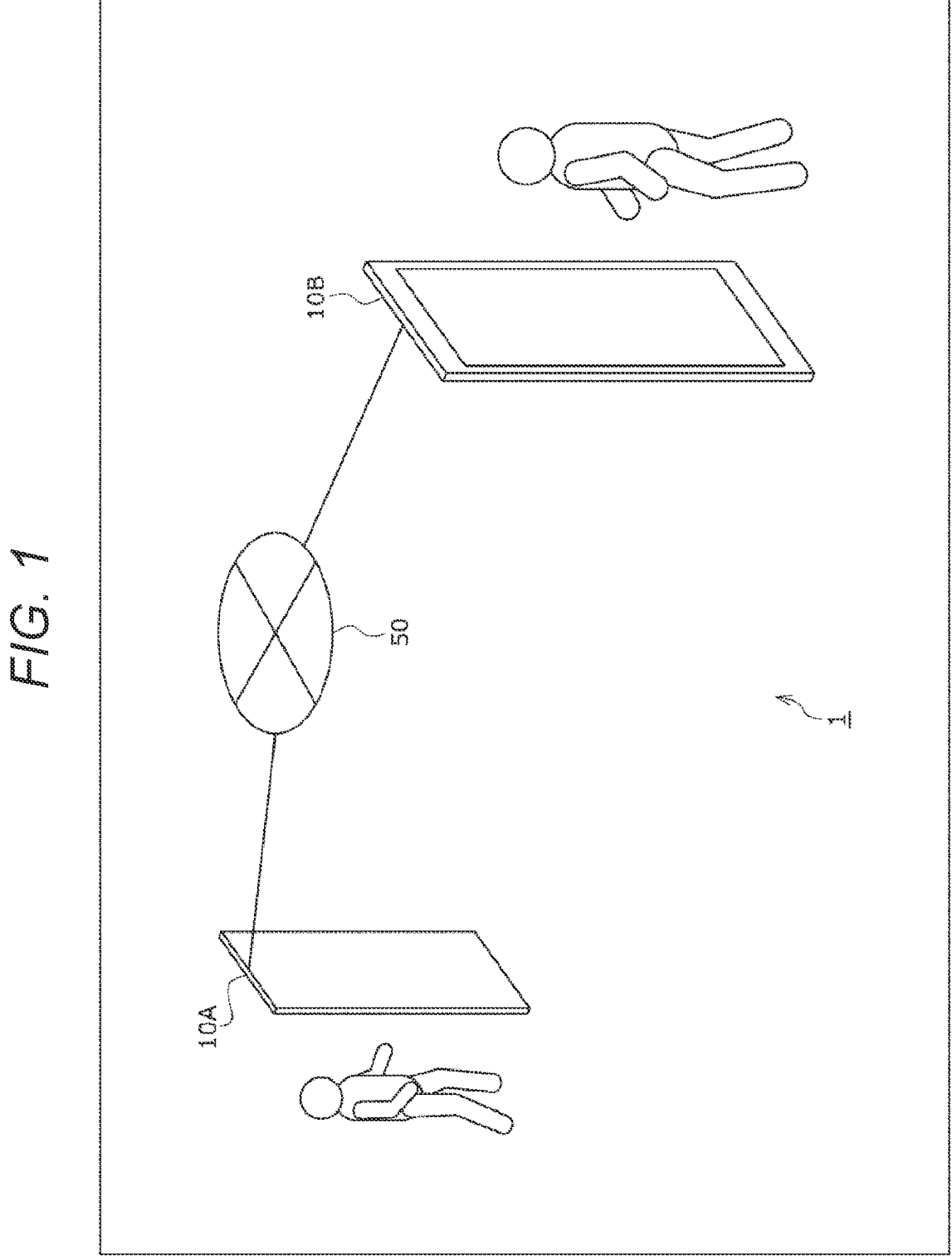
FIG. 1 is a diagram illustrating an example of a configuration of an embodiment of an information processing system to which the present technology is applied.

FIG. 1 illustrates an example of a configuration of an embodiment of an information processing system to which the present technology is applied.

In FIG. 1, an information processing system 1 is configured by connecting two information processing apparatuses 10A and 10B as telepresence apparatuses to a network 50 such as the Internet.

The information processing apparatus 10A and the information processing apparatus 10B are provided in different spaces such as different buildings or different rooms. In other words, in FIG. 1, a user in the vicinity of the information processing apparatus 10A and a user in the vicinity of the information processing apparatus 10B are users at remote locations from each other.

The information processing apparatus 10A and the information processing apparatus 10B basically have the same configuration. Although details will be described later, each of the information processing apparatus 10A and the information processing apparatus 10B is provided with, in addition to a large-sized display, a camera for imaging a surrounding state, a microphone for collecting a surrounding sound such as an environmental sound, a speaker for outputting a sound, and the like.

Between the information processing apparatus 10A and the information processing apparatus 10B, transmission and reception of data such as a video corresponding to a captured image captured by each camera and a sound collected by each microphone are always performed in real time, for example, while connection between both the apparatuses is established.

The information processing apparatus 10A displays a video corresponding to a captured image captured by the information processing apparatus 10B, and outputs a sound collected by the information processing apparatus 10B.

The video corresponding to the captured image captured by the information processing apparatus 10B shows a state of the space in which the information processing apparatus 10B is installed, including appearance of the user in the vicinity of the information processing apparatus 10B. Furthermore, the sound collected by the information processing apparatus 10B includes an environmental sound in the space in which the information processing apparatus 10B is installed, including voice of the user in the vicinity of the information processing apparatus 10B.

Therefore, for example, the user in the vicinity of the information processing apparatus 10A can feel as if the user in the vicinity of the information processing apparatus 10B is present on an opposite side of the nearby information processing apparatus 10A.

Similarly, the information processing apparatus 10B displays a video corresponding to a captured image captured by the information processing apparatus 10A, and outputs a sound collected by the information processing apparatus 10A.

The video corresponding to the captured image captured by the information processing apparatus 10A shows a state of the space in which the information processing apparatus 10A is installed, including appearance of the user in the vicinity of the information processing apparatus 10A. Furthermore, the sound collected by the information processing apparatus 10A includes an environmental sound in the space in which the information processing apparatus 10A is installed, including voice of the user in the vicinity of the information processing apparatus 10A.

Therefore, for example, the user of the information processing apparatus 10B can feel as if the user of the information processing apparatus 10A is present on an opposite side of the nearby information processing apparatus 10B.

The user of the information processing apparatus 10A can naturally communicate with the user of the information processing apparatus 10B as if the user of the information processing apparatus 10B is present in an adjacent space.

Similarly, the user of the information processing apparatus 10B can naturally communicate with the user of the information processing apparatus 10A as if the user of the information processing apparatus 10A is present in an adjacent space.

That is, the users of the information processing apparatus 10A and the information processing apparatus 10B can more smoothly communicate with each other while feeling close to each other without being actively conscious of communication.

Hereinafter, in a case where it is not necessary to distinguish the information processing apparatus 10A and the information processing apparatus 10B from each other, they are collectively referred to as an information processing apparatus 10 as appropriate. Other configurations provided in pairs will be similarly collectively described.

Furthermore, in the following description, of the information processing apparatus 10A and the information processing apparatus 10B, a user who uses one information processing apparatus 10 of interest is simply referred to as a user, and a user who uses another information processing apparatus 10 located remotely is referred to as a partner user to be distinguished.

(Configuration of Apparatus)

Figure 2:
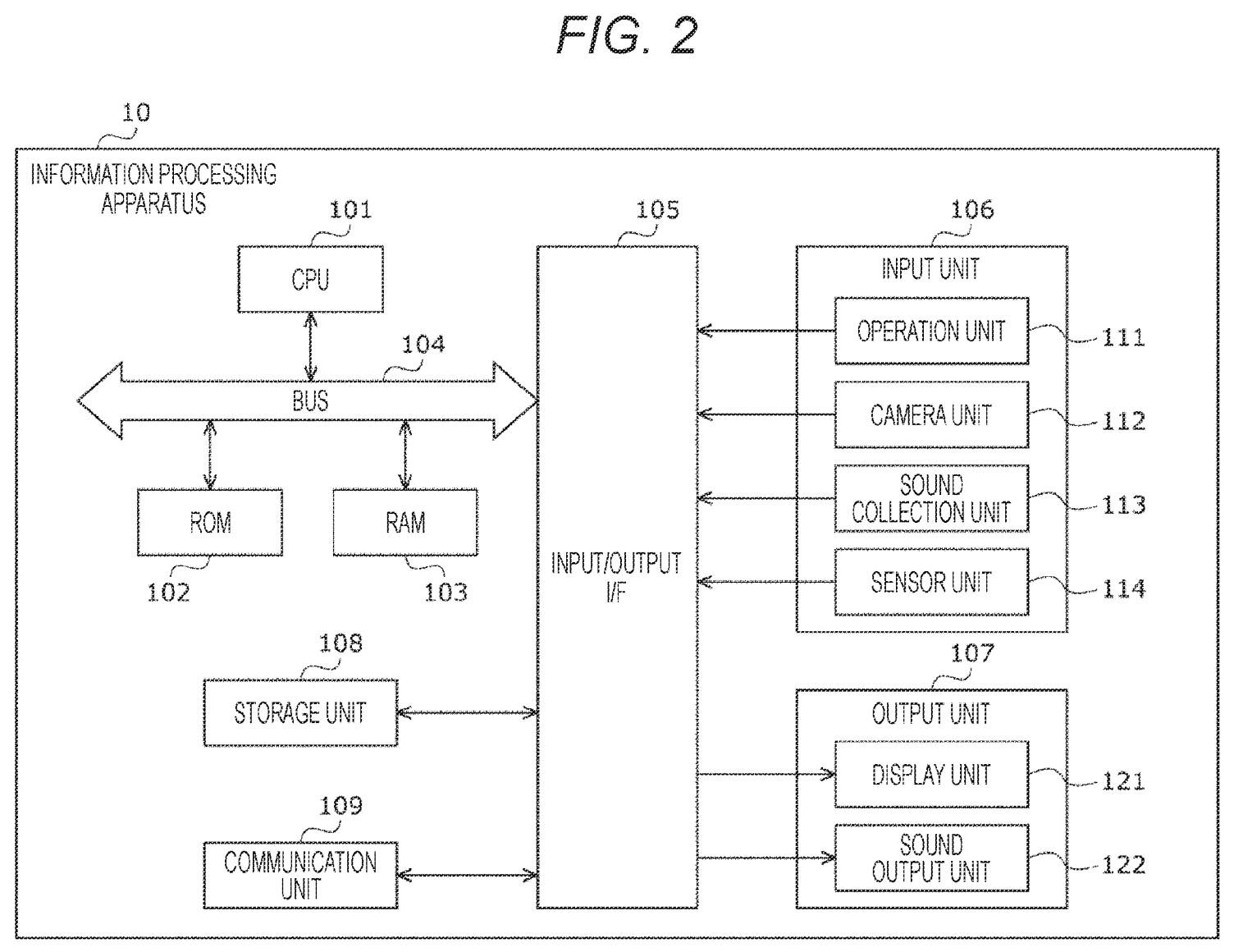

FIG. 2 illustrates an example of a configuration of the information processing apparatus 10 in FIG. 1.

The information processing apparatus 10 is, for example, an apparatus such as a display apparatus connectable to the network 50 such as the Internet, and is configured as a telepresence apparatus.

As illustrated in FIG. 2, in the information processing apparatus 10, a central processing unit (CPU) 101, a read only memory (ROM) 102, and a random access memory (RAM) 103 are mutually connected by a bus 104.

The CPU 101 controls operation of each unit of the information processing apparatus 10 by executing a program recorded in the ROM 102 or a storage unit 108. Various data are appropriately stored in the RAM 103.

Furthermore, an input/output I/F 105 is connected to the bus 104. An input unit 106, an output unit 107, the storage unit 108, and a communication unit 109 are connected to the input/output I/F 105.

The input unit 106 supplies various input data to each unit including the CPU 101 via the input/output I/F 105. For example, the input unit 106 includes an operation unit 111, a camera unit 112, a sound collection unit 113, and a sensor unit 114.

The operation unit 111 is operated by a user and supplies operation data corresponding to the operation to the CPU 101. The operation unit 111 includes a physical button, a touch panel, and the like.

The camera unit 112 photoelectrically converts light from a subject incident thereon, and performs signal processing on an electric signal obtained as a result, thereby generating and outputting captured image data. The camera unit 112 includes an image sensor, a signal processing unit, and the like.

The sound collection unit 113 receives a sound as vibration of air and outputs data of sound information as an electric signal thereof. The sound collection unit 113 is configured as a microphone or the like.

The sensor unit 114 performs sensing of space information, time information, and the like, and outputs sensor data obtained as a result of the sensing.

The sensor unit 114 includes an acceleration sensor, a gyro sensor, and the like. The acceleration sensor measures acceleration in three directions of XYZ axes. The gyro sensor measures angular velocity of three axes of the XYZ axes. Note that an inertial measurement unit (IMU) may be provided to measure three-dimensional acceleration and angular velocity with an accelerometer in three directions and a gyroscope of three axes.

Furthermore, the sensor unit 114 can include various sensors such as a biological sensor that measures information such as a heart rate, a body temperature, or a posture of an organism, a proximity sensor that measures a nearby object, and a magnetic sensor that measures a magnitude and a direction of a magnetic field (magnetic field).

The output unit 107 outputs various information under the control of the CPU 101 via the input/output I/F 105. For example, the output unit 107 includes a display unit 121 and a sound output unit 122.

The display unit 121 displays a video and the like corresponding to the captured image data under the control of the CPU 101. The display unit 121 includes a panel portion such as a liquid crystal panel, an organic light emitting diode (OLED) panel, a signal processing unit, and the like. Furthermore, the display unit 121 may be a projector. The projector can project and display a video corresponding to captured image data on an arbitrary screen.

The sound output unit 122 outputs a sound according to the data of the sound information under the control of the CPU 101. The sound output unit 122 includes a speaker, a headphone connected to an output terminal, and the like.

The storage unit 108 records various data and programs under the control of the CPU 101. The CPU 101 reads and processes various data from the storage unit 108, and executes a program.

The storage unit 108 is configured as an auxiliary storage device such as a semiconductor memory. The storage unit 108 may be configured as an internal storage or may be an external storage such as a memory card.

The communication unit 109 communicates with other devices via the network 50 under the control of the CPU 101. The communication unit 109 is configured as a communication module corresponding to cellular communication (for example, LTE-Advanced, 5G, and the like), wireless communication such as a wireless local area network (LAN), or wired communication.

Note that the configuration of the information processing apparatus 10 illustrated in FIG. 2 is an example, and for example, an image processing circuit such as a graphics processing unit (GPU), a short-range wireless communication circuit that performs wireless communication according to a short-range wireless communication standard such as Bluetooth (registered trademark), near field communication (NFC), a power supply circuit, or the like can be provided.

Figure 3:
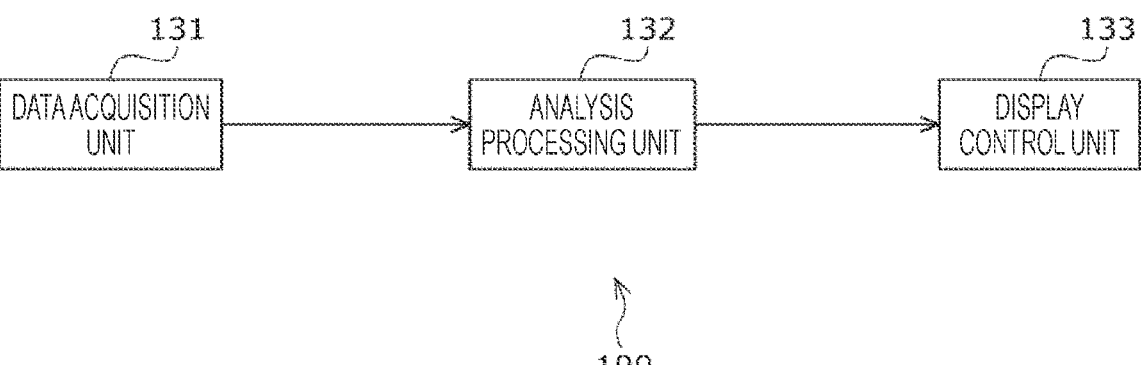
FIG. 3 is a diagram illustrating an example of a functional configuration of a control unit in the information processing apparatus of FIG. 1.

FIG. 3 illustrates an example of a functional configuration of a control unit 100 in the information processing apparatus 10. A function of the control unit 100 is realized by execution of a predetermined program by the CPU 101.

In FIG. 3, the control unit 100 includes a data acquisition unit 131, an analysis processing unit 132, and a display control unit 133.

The data acquisition unit 131 acquires analysis target data input thereto, and supplies it to the analysis processing unit 132.

The analysis target data includes captured image data captured by the camera unit 112 and sensor data detected by the sensor unit 114. The analysis target data is only required to be data used in analysis processing in a subsequent stage, and for example, data of sound information collected by the sound collection unit 113 or the like may be used as the analysis target data.

The analysis processing unit 132 performs analysis processing using the analysis target data supplied from the data acquisition unit 131, and supplies a result of the analysis to the display control unit 133.

For example, the analysis processing unit 132 analyzes a state of a user by using captured image data, sensor data, and the like on the basis of a human visual characteristic. The state of the user includes a state such as a cognitive state and a position of the user. The analysis processing unit 132 determines a shape of a display area of the display unit 121 on the basis of an analysis result of the state of the user, and supplies the shape to the display control unit 133 as an analysis result.

The display control unit 133 controls display of (the panel portion of) the display unit 121 on the basis of the analysis result supplied from the analysis processing unit 132. For example, the display control unit 133 controls display of the shape of the display area of the display unit 121 so as to have a shape according to the analysis result of the state of the user.

The information processing system 1 is configured as described above.

(Change in Shape of Display Area)

In the information processing system 1, in the information processing apparatus 10A and the information processing apparatus 10B connected via the network 50, the shape of the display area of the display unit 121 that displays a video of a partner user at a remote location is not fixed to a rectangular shape having an aspect ratio of 4:3, 16:9, and the like. The shape is variable such that it changes from a rectangular shape to a circular shape.

In the information processing apparatus 10, by changing the shape of the display area to change spatial cognition of a user and a cognition sense of an indication of a person, it is possible to optimally change an atmosphere of a space of a connection destination given to the user, how an indication of the partner user is felt, and the like. Also, by providing a more appropriate degree of connection between both spaces, it is possible for the users at the remote locations to more naturally communicate with each other.

More specifically, in the information processing apparatus 10, the video displayed in the display area having the rectangular shape has an effect of evoking a clearer sense of purpose and an objective viewpoint for the user, and is suitable for situations such as video conferencing and sharing of materials (particularly, materials mainly including language and symbols).

On the other hand, in a situation where it is desired to provide a natural connection feeling as if the users at remote locations are in the same space or to cause accidental communication without having a particular sense of purpose, the shape of the display area can be changed to the circular shape in the information processing apparatus 10.

As described above, in the information processing apparatus 10, by displaying the video including the partner user in the display area having the circular shape, the user can perform more natural and comfortable remote communication by using an effect of easily grasping information of a space on a partner user side in a peripheral sensing manner, without paying attention to detailed information.

Furthermore, the shape of the display area is not limited to a rectangle or a circle, and, for example, may be changed to another shape such as a vertically long ellipse or a semicircle.

More specifically, in the information processing apparatus 10, by combining information such as a position, a height of a viewpoint, and a direction of a user and a human visual characteristic (for example, a field of view characteristic such as human field of view characteristic map information), it is possible to determine an optimum shape of the display area according to an arbitrary visual information priority parameter (for example, an atmosphere, a character, a sign, a person, and the like) and control the shape of the display area.

Figures 4A, 4B:
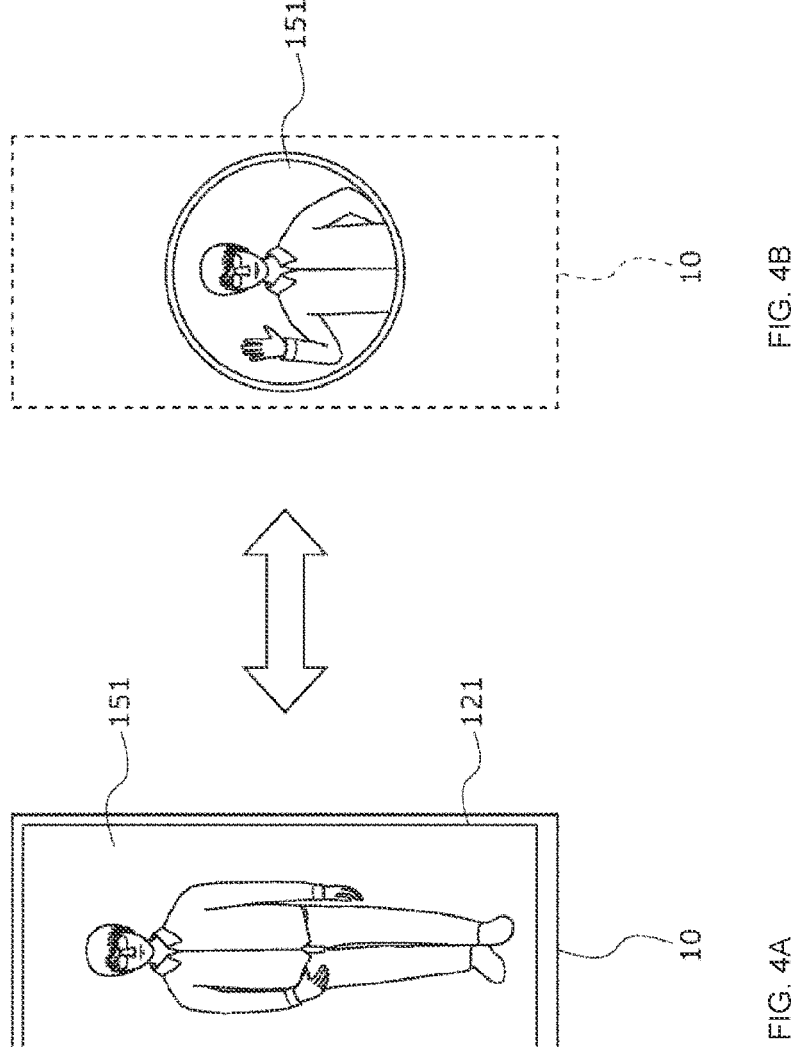
FIGS. 4A and 4B are diagrams illustrating an outline of a change in a shape of a display area of a display unit in the information processing apparatus of FIG. 1.

FIGS. 4A and 4B illustrate an example of a change in a shape of a display area 151 of the display unit 121 in the information processing apparatus 10.

In the information processing apparatus 10 including the rectangular display area 151 illustrated in of FIG. 4A, a video of an entire body of a partner user is displayed in the display area 151.

At this time, the information processing apparatus 10 analyzes a state of the user using the analysis target data such as the sensor data on the basis of a human visual characteristic. For example, the human visual characteristic includes a field of view characteristic such as a discriminative field of view, an effective field of view, a stable gaze field, an induced field of view, and an auxiliary field of view. The state of the user includes a state such as a cognitive state of the user.

The information processing apparatus 10 changes the shape of the display area 151 in the display unit 121 on the basis of an analysis result of the state of the user. In this example, the shape of the display area 151 is changed from the rectangular shape illustrated in FIG. 4A to the circular shape illustrated in FIG. 4B. In the information processing apparatus 10 illustrated in FIG. 4B, a video of an upper body of the partner user is displayed in the display area 151 having the circular shape.

Furthermore, the information processing apparatus 10 can change the shape of the display area 151 from the circular shape illustrated in FIG. 4B to the rectangular shape illustrated in FIG. 4A on the basis of the analysis result of the state of the user.

As described above, in the information processing apparatus 10, by changing the shape of the display area 151 according to the state of the user, it is possible to provide a natural and comfortable continuous connection feeling. Note that, although details will be described later, in the analysis using the analysis target data, for example, a context and a relative relationship with the partner user may be analyzed in addition to the state of the user, and the shape of the display area 151 may be controlled on the basis of a result of the analysis.

For example, by changing the shape of the display area 151 to the circular shape or the elliptical shape, in a telepresence system for improving quality of a relationship with a remote location, it is possible to eliminate a sense of privacy infringement and excessive intention of purpose, and to generate an appropriate co-creation activity while more naturally feeling a space and a partner user.

In FIGS. 4A and 4B, a case where the shape of the display area 151 is changed between the rectangular shape and the circular shape has been exemplified, but various shapes that can be expressed by (the panel portion of) the display unit 121 can be used for the shape of the display area 151. FIGS. 5A, 5B, 50, 5D, 6A, 6B. 6C, 6D, 7A, 7B, 7C, and 7D illustrate examples of the shape of the display area 151.

FIGS. 5A, 5B, 5C, and 5D illustrate a first example of the shape of the display area 151.

FIGS. 5A, 5B, 5C, and 5D illustrate a case where the shape of the display area 151 in the display unit 121 having a panel portion having a vertically long rectangular shape is changed to another shape.

As illustrated in FIG. 5A, an original shape of the display area 151 is a vertically long rectangular shape corresponding to the shape of the panel portion of the display unit 121, but the shape can be changed to, for example, a shape illustrated in any one of FIGS. 5B, 5C, and 5D.

In FIG. 5B, the shape of the display area 151 is changed from a vertically long rectangle to a circle. In FIG. 5C, the shape of the display area 151 is changed from the vertically long rectangle to a vertically long ellipse. In FIG. 5D, the shape of the display area 151 is changed from the vertically long rectangle to a rectangular shape in which predetermined areas at four corners are removed.

Second Example

FIGS. 6A, 6B, 6C, and 6D illustrate a second example of the shape of the display area 151.

FIGS. 6A, 6B, 6C, and 6D illustrate a case where the shape of the display area 151 in the display unit 121 having a panel portion having a horizontally long rectangular shape is changed to another shape.

As illustrated in FIG. 6A, an original shape of the display area 151 is a horizontally long rectangular shape corresponding to the shape of the panel portion of the display unit 121, but the shape can be changed to, for example, a shape illustrated in any one of FIGS. 6B, 6C, and 6D.

In FIG. 6B, the shape of the display area 151 is changed from a horizontally long rectangle to a circle. In FIG. 6C, the shape of the display area 151 is changed from the horizontally long rectangle to a horizontally long ellipse. In FIG. 6D, the shape of the display area 151 is changed from the horizontally long rectangle to a shape of a predetermined symbol such as a heart shape.

FIGS. 7A, 7B, 7C, and 7D illustrate a third example of the shape of the display area 151.

FIGS. 7A, 7B, 7C, and 7D illustrate a case where the shape of the display area 151 in the display unit 121 having a panel portion having a circular shape is changed to another shape.

As illustrated in FIG. 7A, an original shape of the display area 151 is a circular shape corresponding to the shape of the panel portion of the display unit 121, but the shape can be changed to, for example, a shape illustrated in any one of FIGS. 7B, 7C, and 7D.

In FIG. 7B, the shape of the display area 151 is changed from a circle to a rectangle (square). In FIG. 7C, the shape of the display area 151 is changed from the circle to a polygon (hexagon). In FIG. 7D, the shape of the display area 151 is changed from the circle to a semicircle.

As described above, in the information processing apparatus 10, the shape of the display area 151 of the display unit 121 can be changed to various shapes by controlling graphical display, for example. Note that the shape of the display area 151 described above is an example, and may be changed to another shape.

(User Visual Characteristic)

For example, a human field of view characteristic can be used as the human visual characteristic used for analyzing the state of the user.

Figure 8:
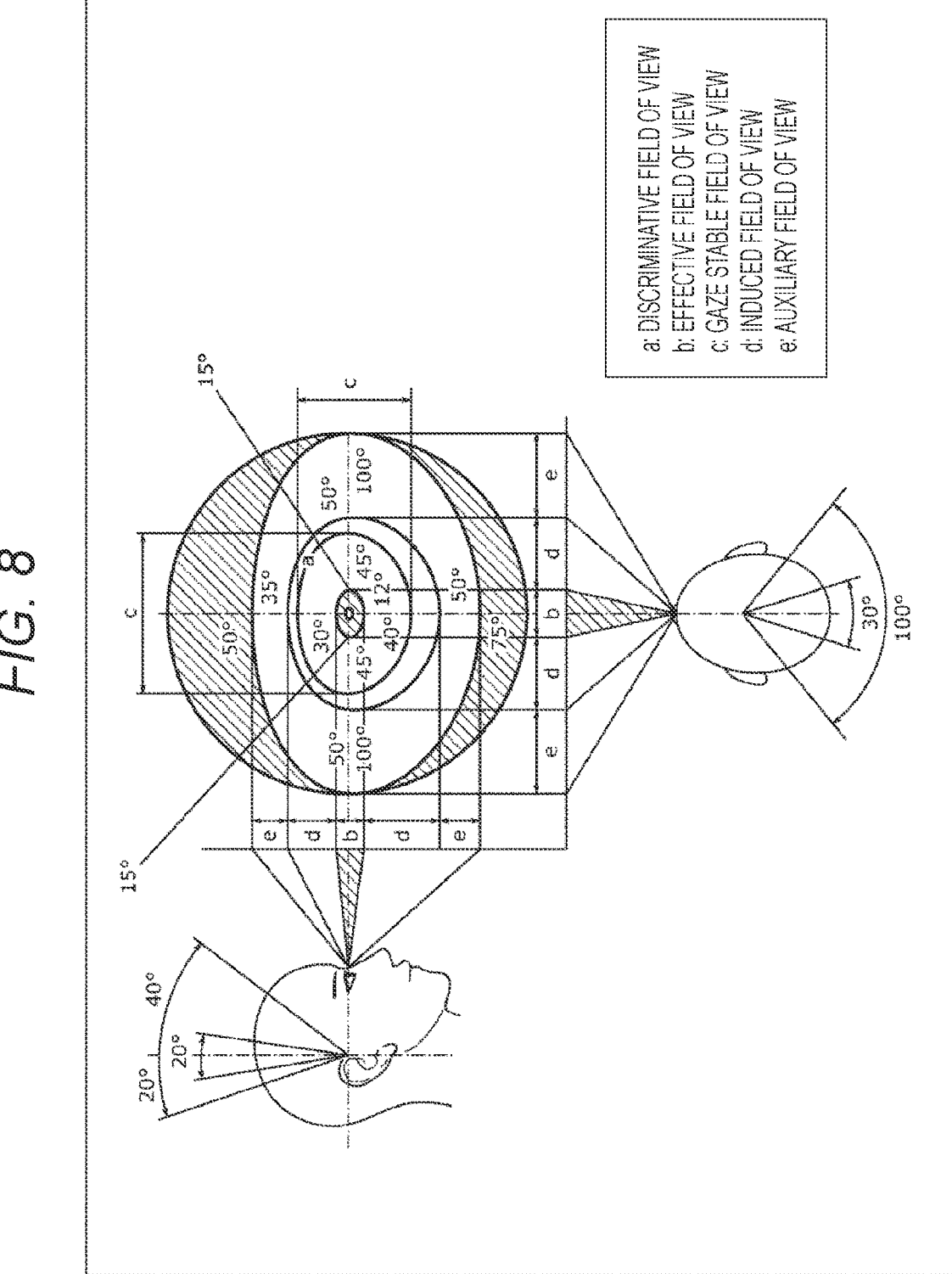
FIG. 8 is a diagram illustrating an example of a human field of view characteristic.

FIG. 8 illustrates an example of the human field of view characteristic.

In FIG. 8, in a case where a human eye is schematically represented, an information reception characteristic in the human field of view is represented by five characteristics of a discriminative field of view, an effective field of view, a gaze stable field of view, an induced field of view, and an auxiliary field of view.

The discriminative field of view is indicated by "a" in FIG. 8, and is a range in which visual functions such as visual acuity and color discrimination are excellent and high-accuracy information can be received. For example, the discriminative field of view is within a range of a few degrees.

The effective field of view is indicated by "b" in FIG. 8, and is a range in which information can be observed only by eye movement and specific information can be instantaneously received from within noise. For example, the effective field of view is within a range of about 15 degrees left and right, about 8 degrees up, and about 12 degrees down.

The gaze stable field of view is indicated by "c" in FIG. 8, and is a range in which head movement occurs in a state of assisting eye movement and gaze can be performed without difficulty. For example, the gaze stable field of view is within a range of 30 to 45 degrees left and right, 20 to 30 degrees up, and 25 to 40 degrees down.

The induced field of view is indicated by "d" in FIG. 8, and is a range that affects human spatial coordinate sense, although there is only discrimination power to the extent that existence of presented information can be discriminated. For example, the induced field of view is within a range of 30 to 100 degrees horizontal and 20 to 85 degrees vertical.

The auxiliary field of view is indicated by "e" in FIG. 8, and is a range in which reception of information is extremely lowered and performs an auxiliary function to the extent that a gaze motion is induced by a strong stimulus or the like. For example, the auxiliary field of view is within a range of 100 to 200 degrees horizontal and 85 to 135 degrees vertical.

Figure 9:
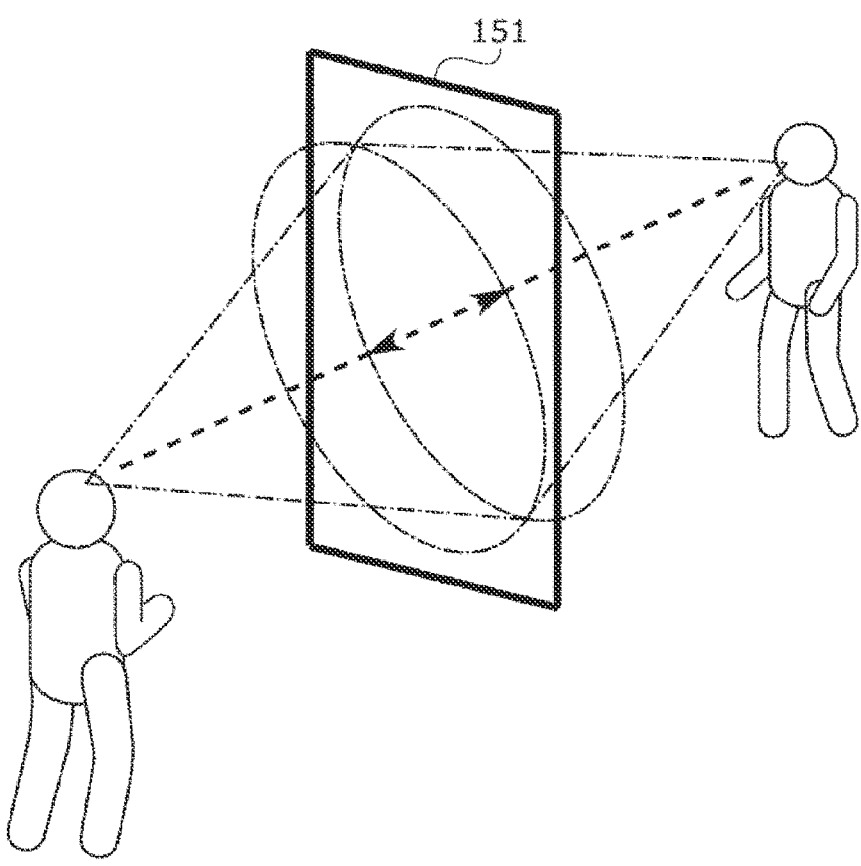
FIG. 9 is a diagram illustrating an example of interaction in a case of a relationship in which users face each other.
Figure 10:
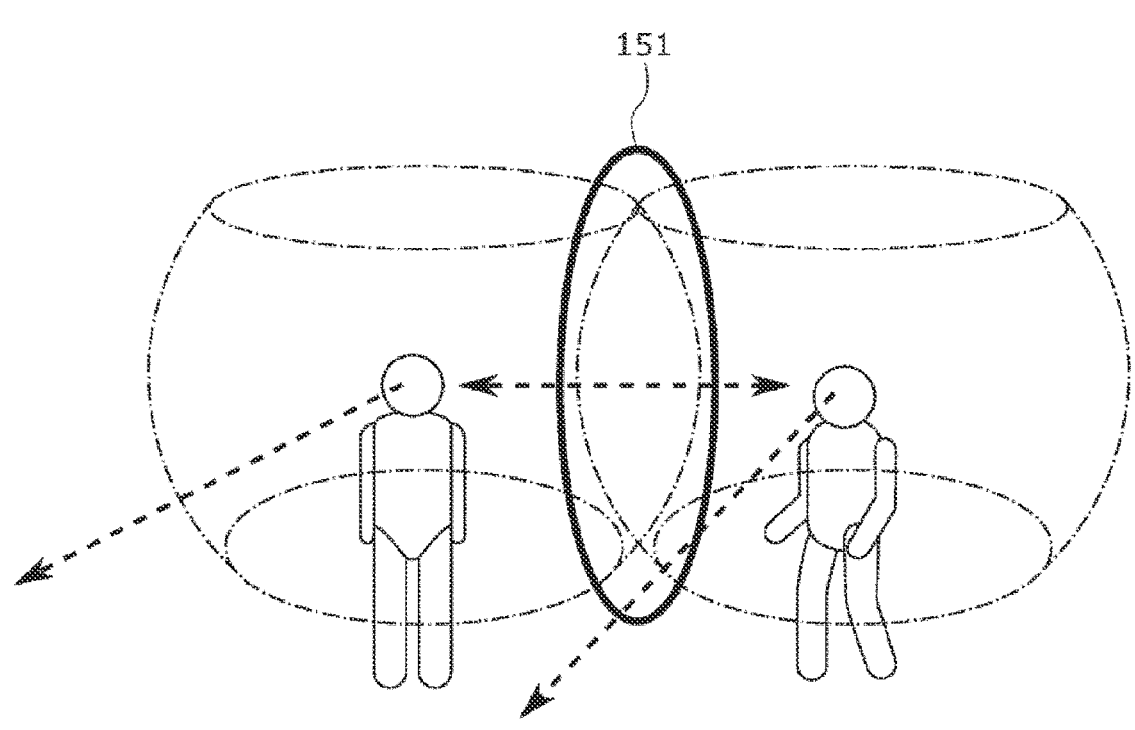
FIG. 10 is a diagram illustrating an example of interaction in a case of a relationship in which users are arranged side by side.

Furthermore, in the information processing system 1, when users at remote locations communicate with each other by the information processing apparatus 10A and the information processing apparatus 10B connected via the network 50, for example, a relationship as illustrated in FIGS. 9 and 10 is assumed as a positional relationship between the users.

As illustrated in FIG. 9, in a case of a relationship in which users face each other via the display area 151 of the information processing apparatus 10 installed in each space that is a remote location, it is possible to perform a dense interaction in which visual, auditory, and interpersonal senses face each other.

On the other hand, as illustrated in FIG. 10, in a case of a relationship in which users are arranged side by side via the display area 151 of the information processing apparatus 10 installed in each space that is a remote location, it is possible to aim at a creative place that is gentle and does not force interaction by intentionally shifting a direction of each sense centering around visual sense.

FIGS. 11A, 11B, and 11C illustrate a relationship between a discriminative field of view, an effective field of view, and a gaze stable field of view.

In FIGS. 11A, 11B, and 11C, the relationship between the discriminative field of view, the effective field of view, and the gaze stable field of view is represented by a relationship between a field of view projected on a certain surface and a vertical field of view and a horizontal field of view with respect to the certain surface.

The discriminative field of view is represented by a field of view $FV0$ that is an area of the innermost ellipse of horizontally long ellipses illustrated in FIG. 11A and includes a high-density dot pattern, and is represented by the following Formula (1) from a relationship between a height $H0$ of the vertical field of view and a width $W0$ of the horizontal field of view.

$$\text{Discriminative field of view } FV_0 : W_0 \times H_0 \tag{1}$$

The effective field of view is represented by a field of view $FV1$ that is an area between the innermost ellipse and the outermost ellipse of the horizontally long ellipses illustrated in FIG. 11A and includes a medium-density dot pattern, and is represented by the following Formula (2)

from a relationship between a height H1 of the vertical field of view and a width W1 of the horizontal field of view.

$$\text{Effective field of view } FV_1{:}W_1{\times}H_1 \qquad (2)$$

The gaze stable field of view is represented by a field of view FV2 that is an area of the outermost ellipse of the horizontally long ellipses illustrated in FIG. 11A and includes a low-density dot pattern, and is represented by the following Formula (3) from a relationship between a height H2 of the vertical field of view and a width W2 of the horizontal field of view.

$$\text{Gaze stable field of view } FV_2{:}W_2{\times}H_2 \qquad (3)$$

Figure 12A:
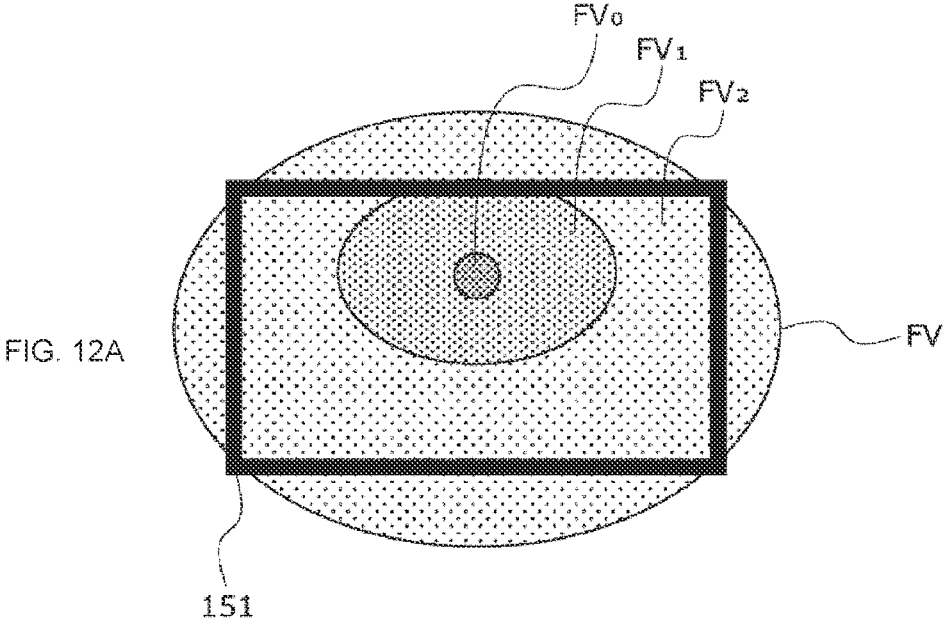
FIGS. 12A and 12B are diagrams illustrating a relationship between an area according to a field of view characteristic including a discriminative field of view, an effective field of view, and a gaze stable field of view and a rectangular or circular display area.
Figure 12B:
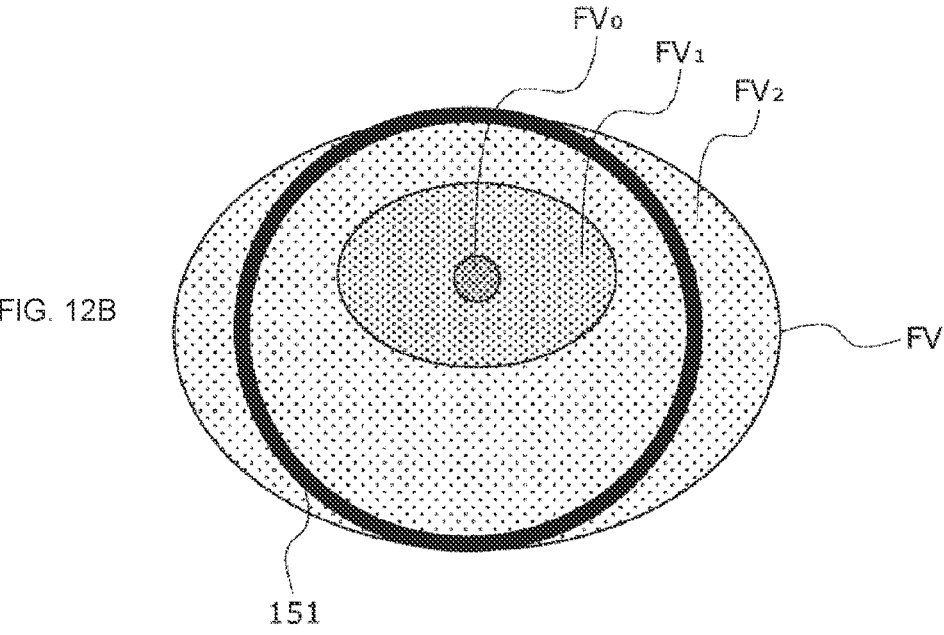

In a case where the human field of view characteristic is used as the human visual characteristic, FIG. 12A illustrates a relationship between a field of view FV including the discriminative field of view FV0, the effective field of view FV1, and the gaze stable field of view FV2 and the display area 151 having a rectangular shape, and FIG. 12B illustrates a relationship between the field of view FV and the display area 151 having a circular shape.

As illustrated in FIGS. 12A and B of FIG. 12B, if the shape of the display area 151 is different between the rectangular shape and the circular shape, the relationship between the discriminative field of view FV0, the effective field of view FV1, and the gaze stable field of view FV2 in the display area 151, that is, the human field of view characteristic is also different. Hereinafter, FIGS. 13A, 13B, 14A, 14B, 15A, 15B, 16A, 16B, 17A, 17B, 18A, and 18B illustrate a relationship between the human field of view characteristic and the display area 151.

Figure 13B:
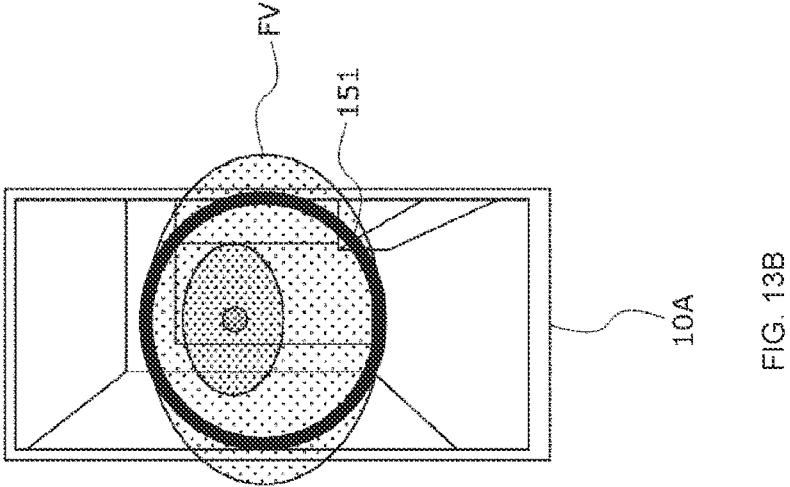
FIGS. 13A and 13B are diagrams illustrating a first example of a relationship between a human field of view characteristic and the display area.
Figure 13A:
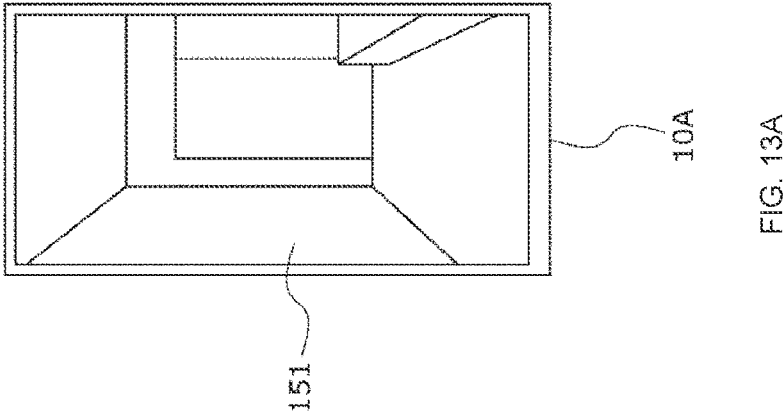

FIGS. 13A and 13B illustrate a first example of the relationship between the human field of view characteristic and the display area 151.

In FIG. 13A, in the information processing apparatus 10A that has the display unit 121 including a panel portion having a vertically long rectangular shape, a state of a space in which the information processing apparatus 10B is installed is shown in the display area 151.

At this time, in a case where the display area 151 is changed from a rectangular shape to a circular shape in the information processing apparatus 10A, the human field of view characteristic is in a state as illustrated in FIG. 13B. In FIG. 13B, a field of view FV of a user is directed to the display area 151 having the circular shape.

As described above, by changing the shape of the display area 151 in the information processing apparatus 10A, it is possible to optimally change how an atmosphere of a space of a connection destination is felt by the user, for example, on the basis of the human field of view characteristic.

Second Example

Figure 14B:
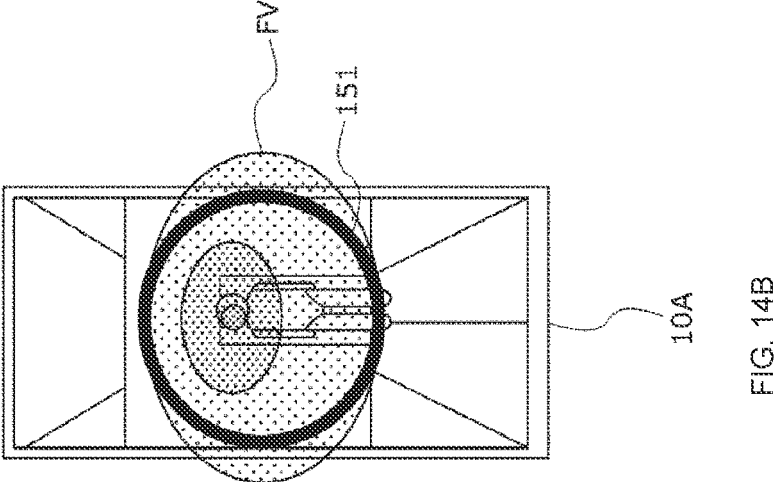
FIGS. 14A and 14B are diagrams illustrating a second example of the relationship between the human field of view characteristic and the display area.
Figure 14A:
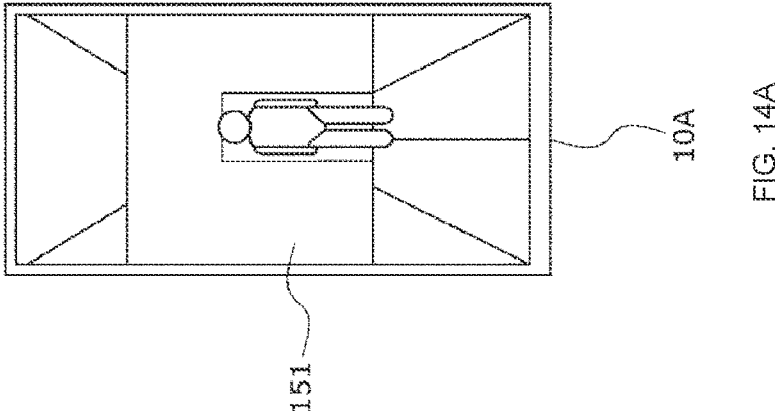

FIGS. 14A and 14B illustrate a second example of the relationship between the human field of view characteristic and the display area 151.

In FIG. 14A, in the information processing apparatus 10A, a state of a partner user near the information processing apparatus 10B in the space in which the apparatus is installed is shown in the display area 151.

At this time, in a case where the display area 151 is changed from a rectangular shape to a circular shape in the information processing apparatus 10A, the human field of view characteristic is in a state as illustrated in FIG. 14B.

In FIG. 14B, the field of view FV of the user is directed to the partner user in the display area 151 having the circular shape. In particular, in this example, the vicinity of a head of the partner user is set within a range of the discriminative field of view FV0 and the effective field of view FV1 of the user.

As described above, by changing the shape of the display area 151 in the information processing apparatus 10A, it is possible to optimally change how an indication of the partner user is felt, for example, on the basis of the human field of view characteristic. Thus, it is possible for the users in the remote locations to more naturally communicate with each other.

Third Example

Figure 15B:
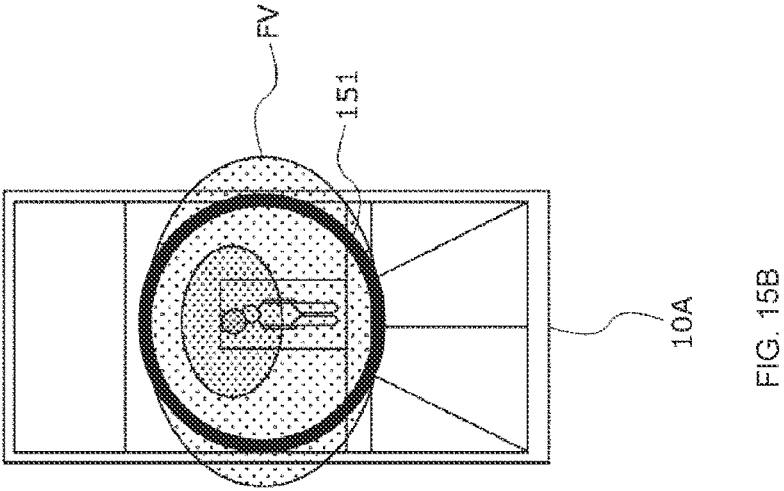
FIGS. 15A and 15B are diagrams illustrating a third example of the relationship between the human field of view characteristic and the display area.
Figure 15A:
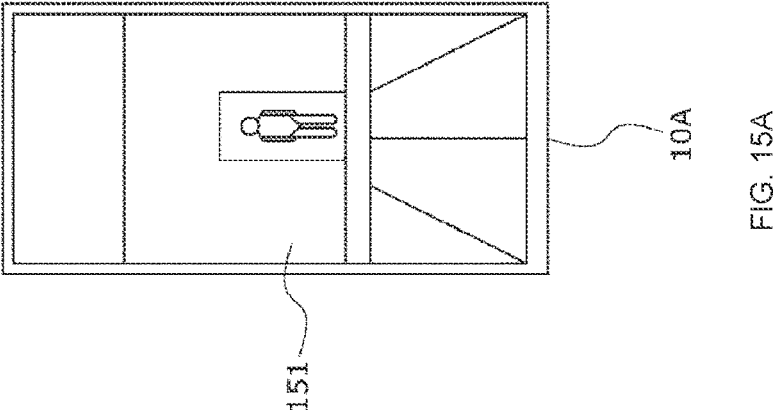

FIGS. 15A and 15B illustrate a third example of the relationship between the human field of view characteristic and the display area 151.

In FIG. 15A, in the information processing apparatus 10A, a state of the partner user near an entrance in the space in which the information processing apparatus 10B is installed is shown in the display area 151.

At this time, in a case where the display area 151 is changed from a rectangular shape to a circular shape in the information processing apparatus 10A, the human field of view characteristic is in a state as illustrated in FIG. 15B.

In FIG. 15B, the field of view FV of the user is directed to the partner user in the display area 151 having the circular shape. In particular, in this example, there is a range of the discriminative field of view FV0 and the effective field of view FV1 of the user near the head of the partner user, and there is a range of the gaze stable field of view FV2 so as to include an entire body of the partner user.

As described above, by changing the shape of the display area 151 in the information processing apparatus 10A, it is possible to optimally change how an indication of the partner user is felt, for example, on the basis of the human field of view characteristic.

Fourth Example

Figure 16B:
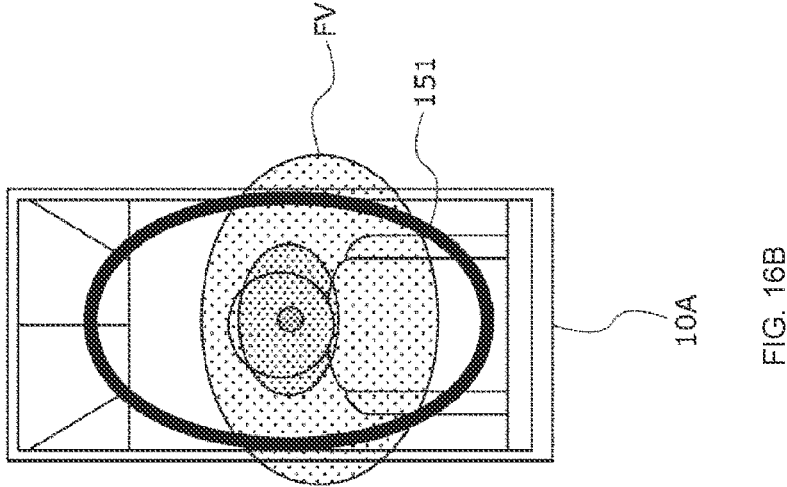
FIGS. 16A and 16B are diagrams illustrating a fourth example of the relationship between the human field of view characteristic and the display area.
Figure 16A:
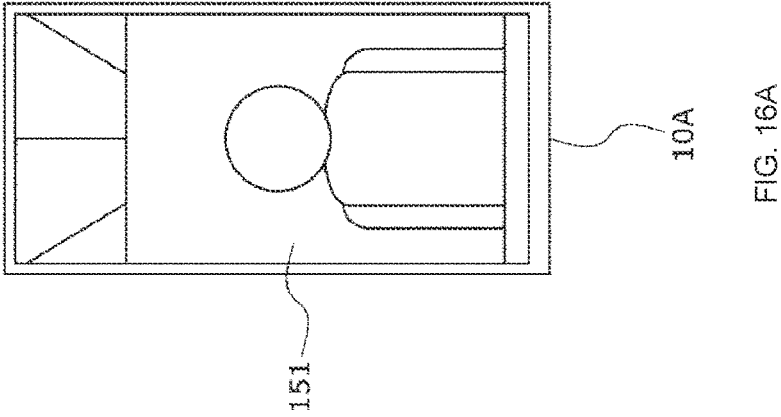

FIGS. 16A and 16B illustrate a fourth example of the relationship between the human field of view characteristic and the display area 151.

In FIG. 16A, in the information processing apparatus 10A, a state of an upper body of the partner user sitting in the very vicinity of the information processing apparatus 10B in the space in which the apparatus is installed is shown in the display area 151.

At this time, in a case where the display area 151 is changed from a rectangular shape to a circular shape in the information processing apparatus 10A, the human field of view characteristic is in a state as illustrated in FIG. 16B.

In FIG. 16B, the field of view FV of the user is directed to the partner user in the display area 151 having the circular shape. In particular, in this example, there is a range of the discriminative field of view FV0 and the effective field of view FV1 of the user near the head of the partner user, and there is a range of the gaze stable field of view FV2 so as to include the upper body of the partner user.

As described above, by changing the shape of the display area 151 in the information processing apparatus 10A, it is possible to optimally change how an indication of the partner user is felt, for example, on the basis of the human field of view characteristic.

Fifth Example

Figure 17A:
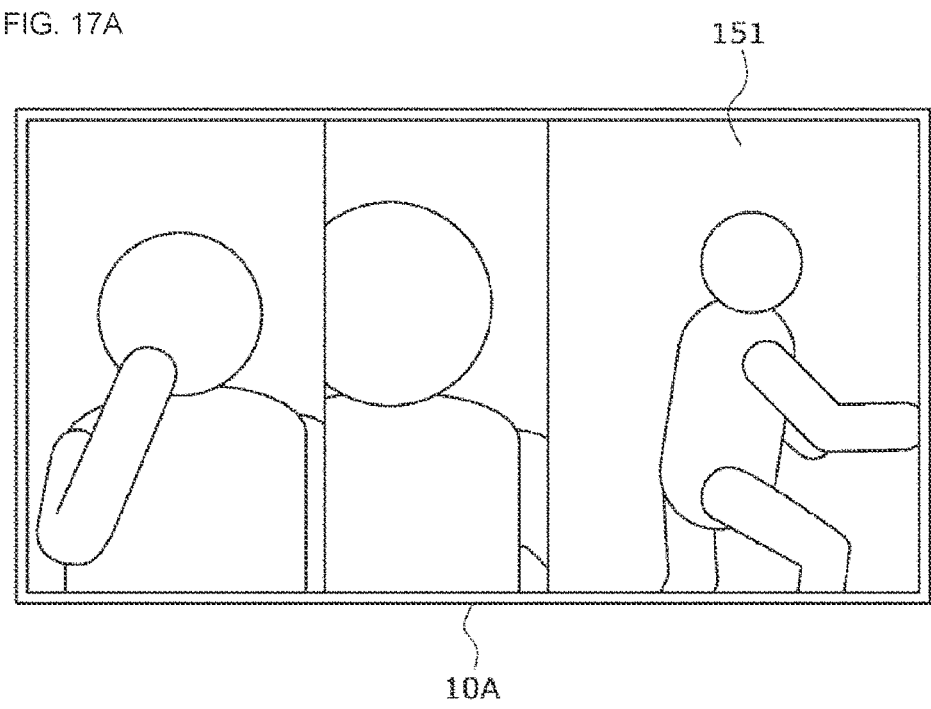
FIGS. 17A and 17B are diagrams illustrating a fifth example of the relationship between the human field of view characteristic and the display area.
Figure 17B:
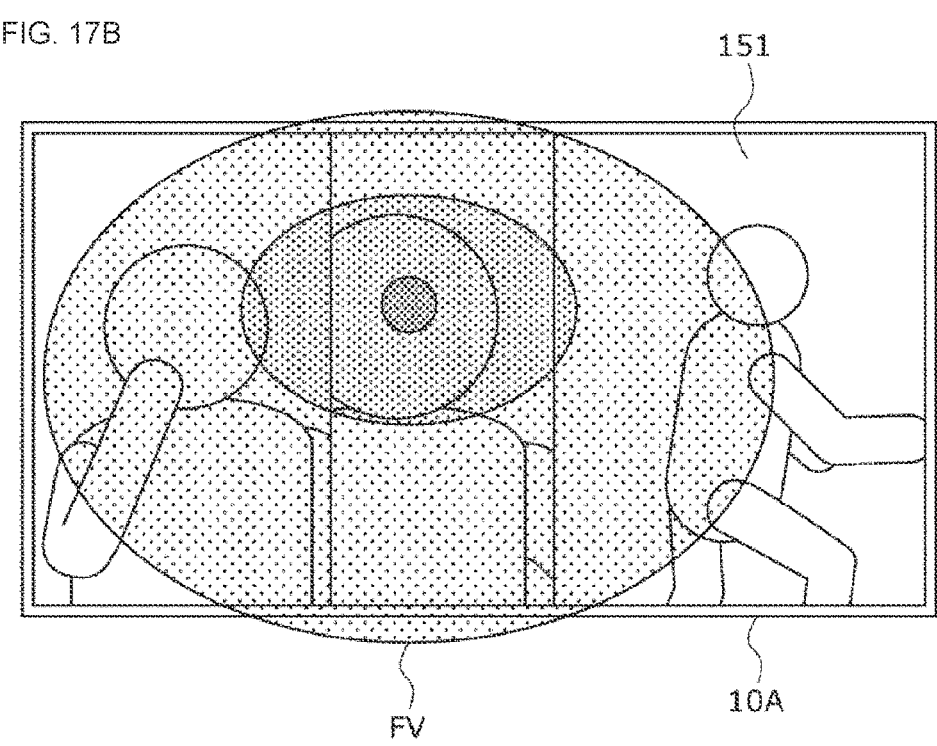

FIGS. 17A and 17B illustrate a fifth example of the relationship between the human field of view characteristic and the display area 151.

In FIG. 17A, in the information processing apparatus 10A, a state of a partner user in the immediate vicinity of the information processing apparatus 10B in the space in which the apparatus is installed is shown in each of the three divided display areas 151.

In this example, the three partner users are in different spaces, and the information processing apparatus 10B is installed in each space. That is, data from the three information processing apparatuses 10B is transmitted to the information processing apparatus 10A via the network 50.

As illustrated in FIG. 17B, in this example, the vicinity of a head of the partner user in a middle area (the narrowest area) of the three divided display areas 151 is set within a range of the discriminative field of view FV0 and the effective field of view FV1 of the user.

As described above, in the information processing apparatus 10A, the area of the display area 151 may be divided by dividing the area into three in a predetermined direction, for example, on the basis of an analysis result of a user state and the like.

Sixth Example

Figure 18A:
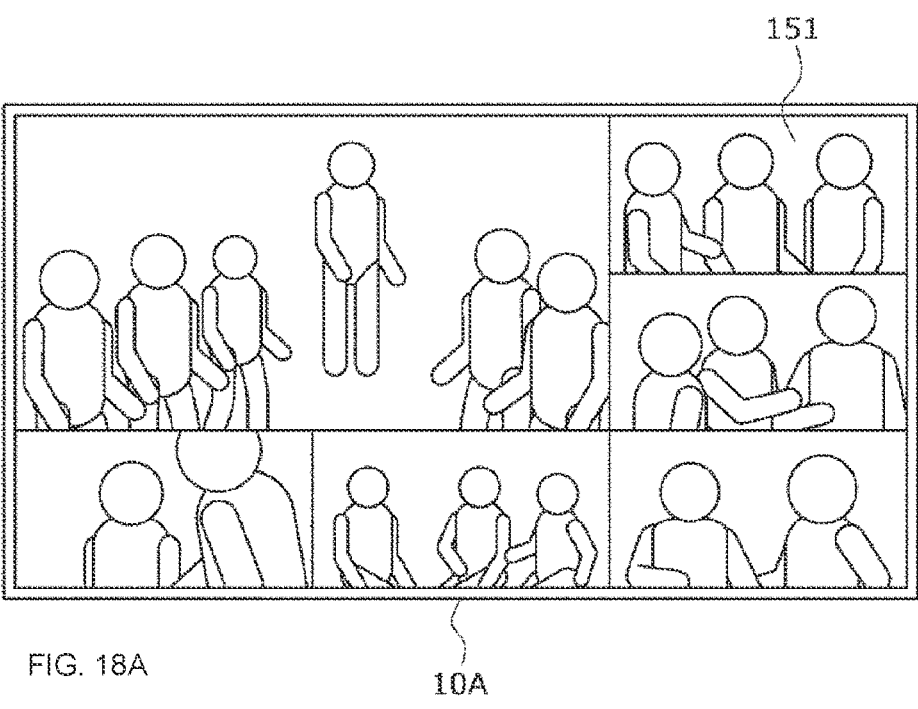
FIGS. 18A and 18B are diagrams illustrating a sixth example of the relationship between the human field of view characteristic and the display area.
Figure 18B:
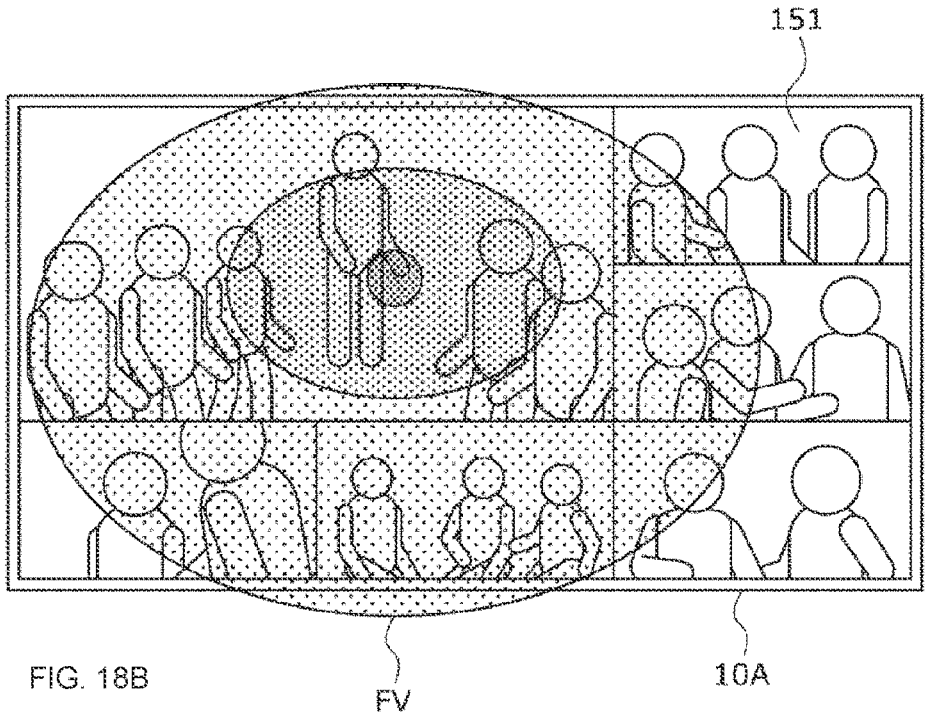

FIGS. 18A and 18B illustrate a sixth example of the relationship between the human field of view characteristic and the display area 151.

In FIG. 18A, in the information processing apparatus 10A, a state of partner users in the vicinity of the information processing apparatus 10B in the space in which the apparatus is installed is shown in each of the six divided display areas 151.

In this example, a plurality of partner users is in the same space or different spaces, and the information processing apparatus 10B is installed in each space. That is, data from a maximum of six information processing apparatuses 10B is transmitted to the information processing apparatus 10A via the network 50.

As illustrated in FIG. 18B, in this example, a plurality of partner users in an upper left widest area of the six divided display areas 151 is set within a range of the discriminative field of view FV0 and the effective field of view FV1 of the user.

As described above, in the information processing apparatus 10A, the area of the display area 151 may be divided by dividing the area into six in an arbitrary size on the basis of an analysis result of a user state and the like.

(Flow of Processing of Each Apparatus)

Next, a flow of processing performed between the information processing apparatus 10A installed in a space at point A and the information processing apparatus 10B installed in a space at point B will be described with reference to a flowchart in FIG. 19.

Figure 19:
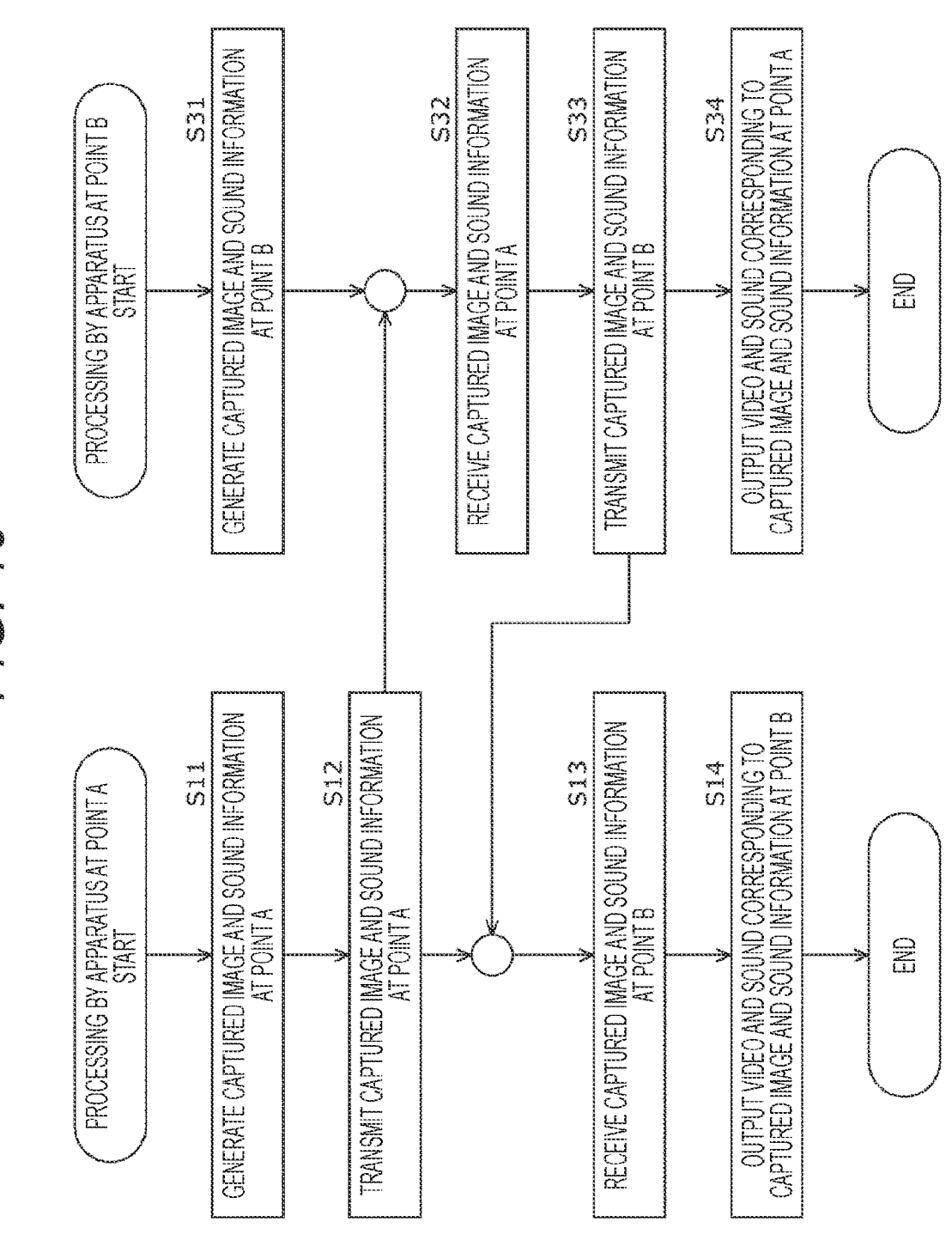
FIG. 19 is a flowchart illustrating a flow of processing performed between the apparatuses.

In FIG. 19, the processing in steps S11 to S14 is executed by the information processing apparatus 10A installed in the space at point A.

In the information processing apparatus 10A, captured image data is generated by the camera unit 112, sound information data is generated by the sound collection unit 113 (S11), and the generated captured image and sound information data are transmitted to the information processing apparatus 10B via the network 50 (S12).

Furthermore, in the information processing apparatus 10A, the captured image and the sound information data transmitted from the information processing apparatus 10B via the network 50 are received (S13), and a video and a sound in the space at point B are output on the basis of the received captured image and sound information data (S14).

On the other hand, the processing in steps S31 to S34 is executed by the information processing apparatus 10B installed in the space at point B.

In the information processing apparatus 10B, captured image data is generated by the camera unit 112, sound information data is generated by the sound collection unit 113 (S31), and the generated captured image and sound information data are transmitted to the information processing apparatus 10A via the network 50 (S33).

Furthermore, in the information processing apparatus 10B, the captured image and the sound information data transmitted from the information processing apparatus 10A via the network 50 are received (S32), and a video and a sound in the space at point A are output on the basis of the received captured image and sound information data (S34).

As described above, between the information processing apparatus 10A and the information processing apparatus 10B, transmission and reception of data such as captured images captured by the camera units 112 and sounds collected by the sound collection units 113 are always performed in real time, for example, while connection between both the apparatuses is established. Note that, although not described here, various data such as sensor data are also transmitted and received between the information processing apparatus 10A and the information processing apparatus 10B in addition to the captured image and the sound data.

The information processing apparatus 10A displays the video imaged by the information processing apparatus 10B and outputs the collected sound, while the information processing apparatus 10B displays the video imaged by the information processing apparatus 10A and outputs the collected sound. Therefore, users of the information processing apparatus 10A and 10B can feel as if partner users of the information processing apparatus 10B and 10A are present on the opposite side of the nearby information processing apparatuses 10A and 10B.

Figure 20:
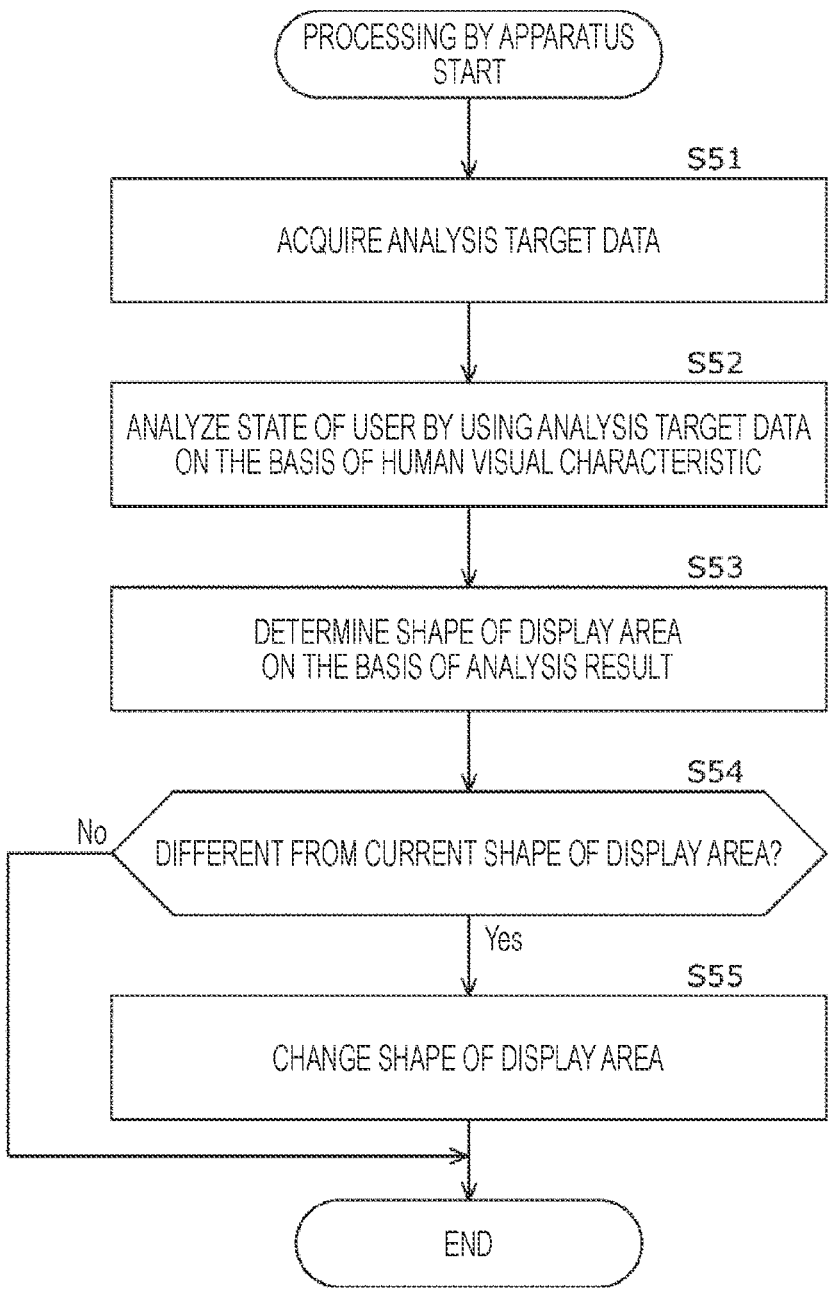
FIG. 20 is a flowchart illustrating a flow of display area shape control processing.

Next, display area shape control processing executed by the information processing apparatus 10A at point A and the information processing apparatus 10B at point B will be described with reference to a flowchart in FIG. 20.

In step S51, the data acquisition unit 131 acquires captured image data captured by the camera unit 112, sensor data detected by the sensor unit 114, and the like as analysis target data.

In step S52, the analysis processing unit 132 performs processing of analyzing a state of a user by using the acquired analysis target data on the basis of a human visual characteristic.

For example, as the human visual characteristic, the human field of view characteristic described with reference to FIGS. 8, 9, 10, 11A, 11B, 11C, 12A, 12B, 13A, 13B, 14A, 14B, 15A, 15B, 16A, 16B, 17A, 17B, 18A, and 18B can be used. Furthermore, for example, the state of the user includes a cognitive state of the user and the like. That is, in the analysis processing of the state of the user, the field of view characteristic including a discriminative field of view, an effective field of view, a gaze stable field of view, and the like is used as standard visual ability, and information obtained by adding an individual characteristic, a condition, and the like of each user to the standard visual ability is used as so-called visual recognition characteristic information.

In step S53, the analysis processing unit 132 determines a shape of the display area 151 of the display unit 121 on the basis of an analysis result of the state of the user.

In step S54, the analysis processing unit 132 determines whether the determined shape of the display area 151 is different from a current shape of the display area 151.

In a case where the determined shape of the display area 151 is determined to be different from the current shape of the display area 151 in the determination processing of step S54, the processing proceeds to step S55.

In step S55, the display control unit 133 controls display of (the panel portion of) the display unit 121 to change the current shape of the display area 151 to the determined shape of the display area 151.

More specifically, in the information processing apparatus 10, in a case where the current shape of the display area 151 is a rectangle, when the determined shape of the display area 151 is a circle, the shapes are different. Thus, the shape of the display area 151 changes from the rectangle to the circle (example of FIGS. 4A and 4B).

At this time, for example, the display control unit 133 can change the shape of the display area 151 to the circle by setting a portion corresponding to a circular shape on the panel portion of the display unit 121 as the display area 151 and setting a portion excluding the portion corresponding to the circular shape as a non-display area (for example, a black area and the like). Furthermore, when changing the shape of the display area 151, the shape may be continuously changed from the rectangle to the circle, or the shape may be discontinuously changed (may be instantaneously switched from the rectangle to the circle).

Note that, in a case where a projector is used as the display unit 121, a shape of a projection surface of a video projected by the projector is only required to be changed from a rectangle to a circle.

On the other hand, in a case where the determined shape of the display area 151 is determined to be the same as the current shape of the display area 151 in the determination processing of step S54, the processing of step S55 is skipped, and the processing is terminated.

The flow of the display area shape control processing has been described above. In this display area shape control processing, in each of the information processing apparatus 10A and the information processing apparatus 10B, the shape of the display area 151 of the display unit 121 that displays the video of the partner user at the remote location is not fixed to the rectangular shape and the like, but the shape of the display area 151 changes from the rectangle to the circle or the like according to the analysis result of the state of the user. Thus, it is possible to optimally change an atmosphere of a space of a connection destination given to the user, how an indication of the partner user is felt, and the like. Therefore, the users at the remote locations can more naturally communicate with each other.

Note that, in the analysis processing described above, the case of analyzing the state of the user has been exemplified, but besides the state of the user, for example, a context, a relative relationship with a partner user, or the like may be analyzed and added to an analysis result.

That is, the analysis processing unit 132 analyzes the context on the basis of the analysis target data such as the sensor data, and the display control unit 133 controls the shape of the display area 151 on the basis of an analysis result of at least one of the state of the user or the context.

Furthermore, when analyzing the context on the basis of the analysis target data such as the sensor data, the analysis processing unit 132 may analyze an influence on the user due to the context and analyze a cognitive state of the user on the basis of an analysis result of the influence on the user. In this way, by analyzing the cognitive state of the user using the context, it is possible to reduce cost as compared with a case where the cognitive state is analyzed by sensing an electroencephalogram, a living body, behavior, and the like.

For example, the context can include information regarding a situation in which the information processing apparatus 10 is used, such as information regarding a space in which the information processing apparatus 10 is installed, information regarding a climate around the space, and information regarding a building in which the space exists or equipment of the building.

Furthermore, the analysis processing unit 132 analyzes a relative relationship with a partner user on the basis of the analysis target data such as the sensor data and the like, and the display control unit 133 controls the shape of the display area 151 on the basis of an analysis result of at least one of the state of the user or the relative relationship.

For example, by analyzing the relative relationship with the partner user, the shape of the display area 151 can be set to a shape with a high degree of disclosure or a shape with a high privacy protection effect according to the degree of intimacy, the degree of reliability, and the like between the users in the spaces in which the information processing apparatus 10A and the information processing apparatus 10B are installed. Furthermore, for example, the shape of the display area 151 may be similarly optimized depending on conditions such as a case where a main user is present in either space or a case where almost no person is present.

Note that when the shape of the display area 151 is changed in the information processing apparatus 10, the shape may be changed to a shape estimated from the analysis target data such as the sensor data by using a determination model learned by machine learning that uses learning data regarding the shape of the display area. As a method of the machine learning, for example, a neural network or deep learning can be used. Furthermore, in the information processing apparatus 10, an initial shape of the display area 151 on the display unit 121 may be a shape corresponding to a position of the user with respect to the information processing apparatus 10 (user position assumed in advance).

Furthermore, the information processing apparatus 10 may sense a motion of a gaze point (line of sight) of the user (including, for example, speech analysis and behavior analysis in addition to detection of an electroencephalogram and biometric information), estimate a cognitive or brain mode of the user, and bring the shape of the display area 151 closer to a shape suitable for the state. Furthermore, on the contrary, the shape of the display area 151 may be changed in a direction of changing to the cognitive mode to be guided. Note that, in executing these processing, cognitive abilities (sight, knowledge, experience, preference, and the like) of individual users may be optimized.

2. Modified Examples (Other Configurations of Apparatus)

In the above description, a case where the shape of the display area 151 is changed in a so-called graphical user interface (GUI) manner by controlling the display of the display unit 121 has been described. However, the shape of the display area 151 may be changed in a so-called mechanical manner by driving a predetermined mechanism provided in the information processing apparatus 10.

Figure 21:
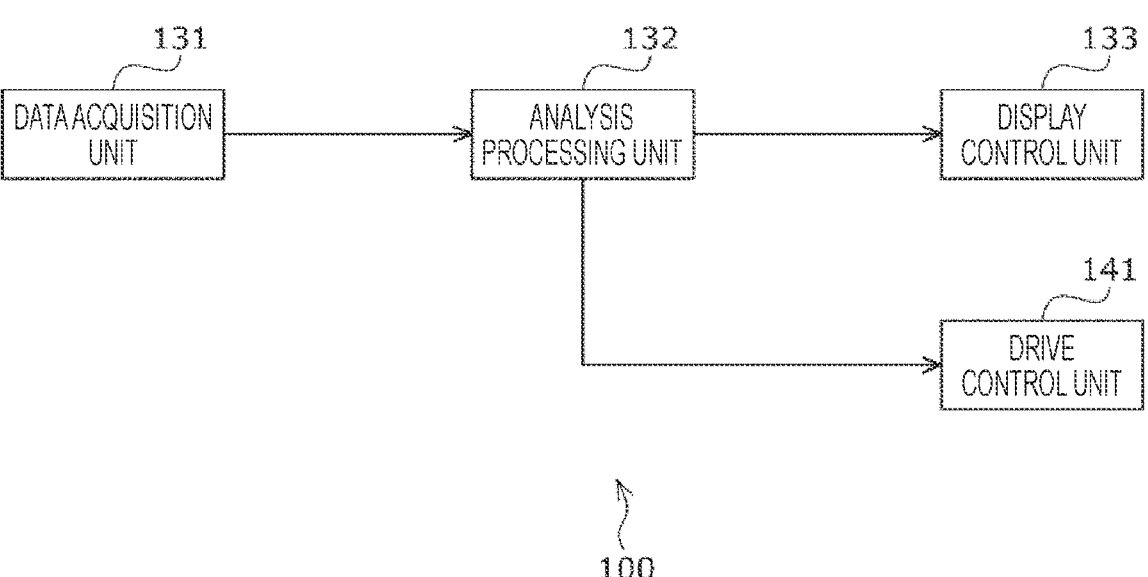
FIG. 21 is a diagram illustrating another example of the functional configuration of the control unit in the information processing apparatus of FIG. 1.

FIG. 21 illustrates another example of the functional configuration of the control unit 100.

In the control unit 100 of FIG. 21, a drive control unit 141 is newly provided as compared with the configuration illustrated in FIG. 3.

The drive control unit 141 controls driving of a predetermined mechanism provided for the display unit 121 on the basis of an analysis result supplied from the analysis processing unit 132. For example, the predetermined mechanism includes a member or a drive unit for concealing a part of the panel portion of the display unit 121 so as not to be visible to a user, and when the member is driven to a predetermined position, a shape of the display area 151 in the display unit 121 changes from a rectangular shape to a circular shape or the like in a case of being viewed from the user.

As described above, in the information processing apparatus 10, the shape of the display area 151 in the display unit 121 can be changed by controlling the graphical display or by driving the predetermined mechanism. Furthermore, in a case where the display unit 121 having a flexible panel portion such as an OLED (a flexible display) is provided, the shape of the display area 151 may be changed by physically changing the shape of the panel portion. Note that the shape of the display area 151 may be changed according to a predetermined operation by a user.

(Other Configurations of System)

In the description of FIGS. 2 and 3, the control unit 100 is provided in the information processing apparatus 10, but all or part of the function of the control unit 100 may be realized in a server connected to the network 50.

Figure 22:
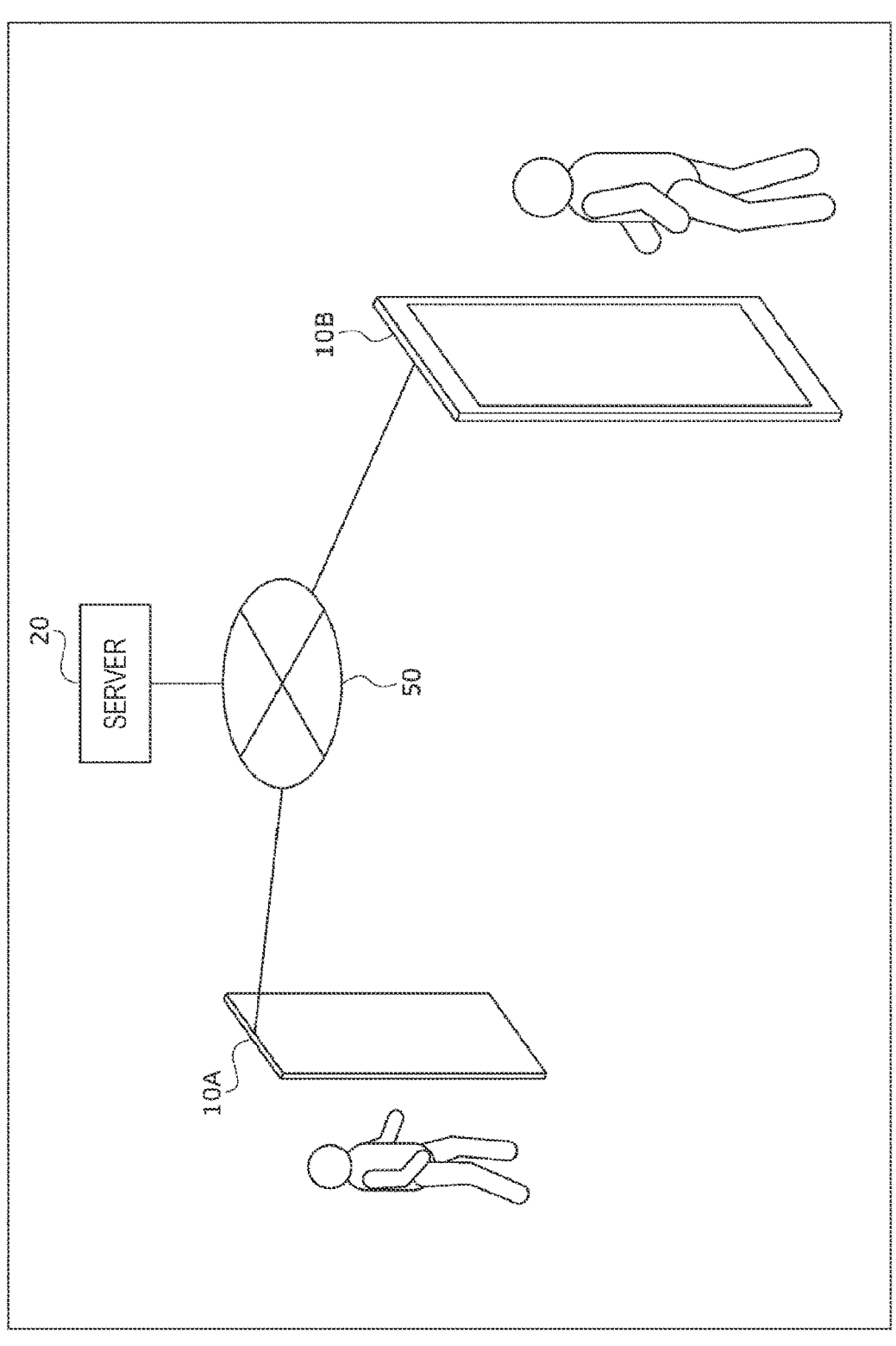
FIG. 22 is a diagram illustrating another example of the configuration of the embodiment of the information processing system to which the present technology is applied.

FIG. 22 illustrates another example of the configuration of one embodiment of the information processing system to which the present technology is applied.

The information processing system illustrated in FIG. 22 is configured by connecting each of the information processing apparatus 10A, the information processing apparatus 10B, and a server 20 via the network 50 such as the Internet and the like. The server 20 is provided with all or part of the configuration of the control unit 100 described with reference to FIG. 3 or 21.

In this manner, the control unit 100 may be provided outside the information processing apparatus 10.

For example, various types of data such as a captured image, sound information, and environmental information are transmitted from the information processing apparatus 10 to the server 20. Furthermore, for example, various types of data such as a captured image, sound information, and environmental information of a connection destination are transmitted from the server 20 to the information processing apparatus 10.

A home server that controls the information processing apparatus 10 may be provided in the information processing apparatus 10.

Figure 23:
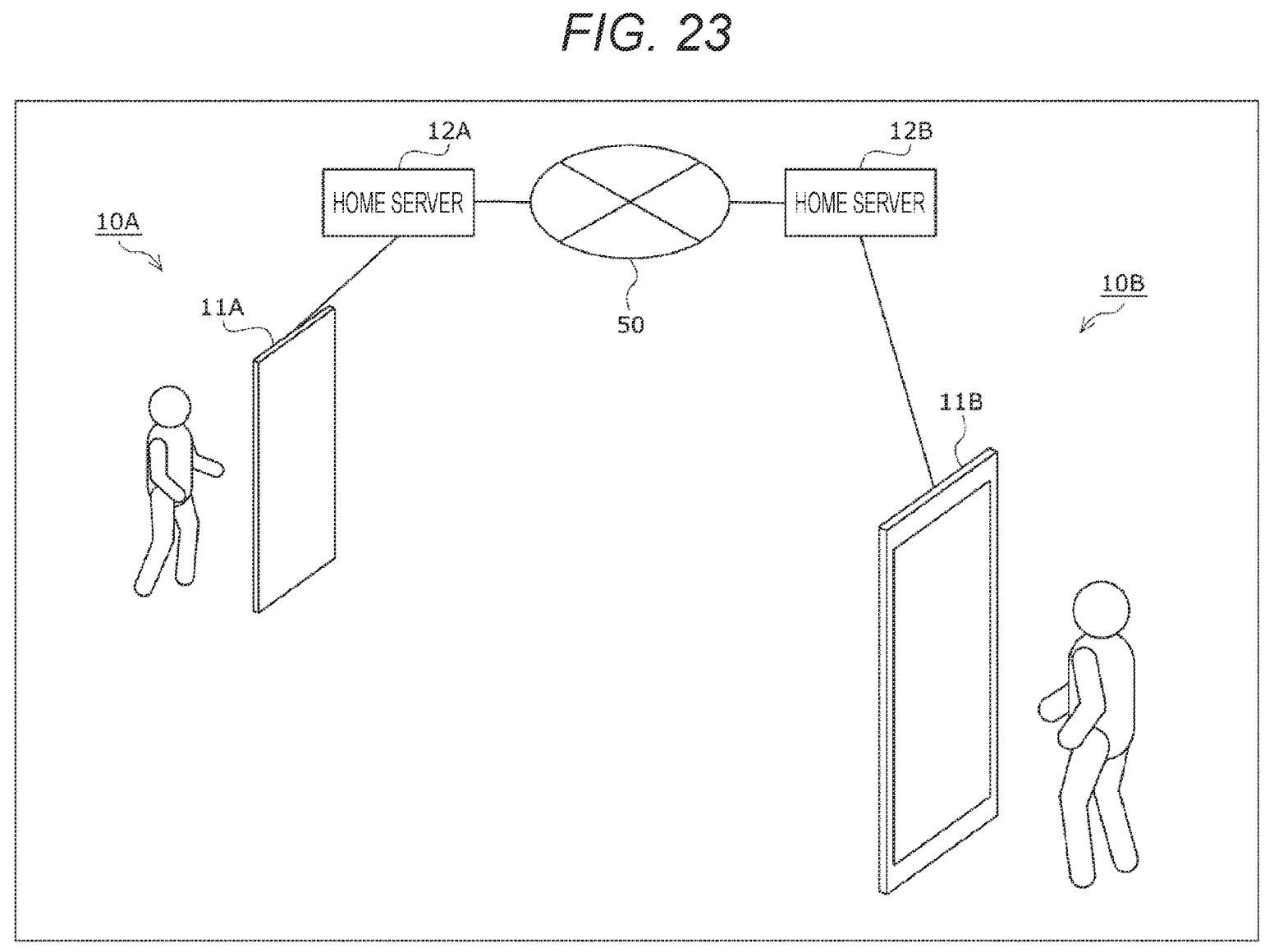

FIG. 23 is a diagram illustrating still another example of the configuration of one embodiment of the information processing system to which the present technology is applied.

The information processing system illustrated in FIG. 23 is configured by connecting the information processing apparatus 10A and the information processing apparatus 10B via the network 50.

The information processing apparatus 10A includes an input/output unit 11A and a home server 12A. The input/output unit 11A is provided with at least configurations of the input unit 106 (FIG. 2) and the output unit 107 (FIG. 2). Furthermore, the home server 12A is provided with at least configurations of the control unit 100 (FIGS. 3 and 21) and the communication unit 109 (FIG. 2). The home server 12A is connected with a home server 12B of the information processing apparatus 10B via the network 50.

Similarly, the information processing apparatus 10B includes an input/output unit 11B and the home server 12B. The input/output unit 11B is provided with at least configurations of the input unit 106 (FIG. 2) and the output unit 107

(FIG. 2). Furthermore, the home server 12B is provided with at least configurations of the control unit 100 (FIGS. 3 and 21) and the communication unit 109 (FIG. 2). The home server 12B is connected with the home server 12A of the information processing apparatus 10A via the network 50.

In this manner, the configuration such as the control unit 100 may be provided outside an input/output unit 11 including the display unit 121 and the like.

Note that a part of the configuration of the control unit 100 may be provided in the home servers 12A and 12B, and the remaining part of the control unit 100 may be provided in the input/output units 11A and 11B.

As described above, in the present technology, the state of the user and the context, the relative relationship with the partner user, and the like are analyzed using the analysis target data such as the sensor data on the basis of a human visual characteristic, and the shape of the display area of the display device is controlled on the basis of the analysis result.

Therefore, when users at remote locations communicate with each other using a video communication system (telepresence system), more natural communication can be performed.

Furthermore, in a telepresence system for improving quality of a relationship with a remote location, it is possible to eliminate a sense of privacy infringement and excessive intention of purpose, and to generate an appropriate co-creation activity while more naturally feeling a space and a partner user. Moreover, since the shape of the display area is changed according to the state of the user, a natural and comfortable continuous connection feeling can be obtained.

Moreover, it is possible to change user's sense, a manner of communication, and the like from an environment side of the system. Furthermore, since the users communicate with each other using the telepresence apparatus including the display, the users can more naturally communicate with each other as compared with an environment such as virtual reality (VR) in which a special device such as a head mounted display needs to be worn on a head.

3. Configuration of Computer

The series of processing of the information processing apparatus 10 described above can be executed by hardware or software. In a case where the series of processing is executed by the software, a program constituting the software is installed on a computer of each apparatus.

The program executed by the computer (CPU) can be provided by being recorded in, for example, a removable recording medium (for example, a magnetic disk, an optical disk, a magneto-optical disk, a semiconductor memory, or the like) as a package medium and the like. Furthermore, the program can be provided via a wired or wireless transmission medium such as a local area network, the Internet, or digital satellite broadcasting.

In the computer, the program can be installed in a recording unit via an input/output interface by attaching the removable recording medium to a drive. Furthermore, the program can be received by a communication unit via a wired or wireless transmission medium and installed in the recording unit. In addition, the program can be installed in a ROM or the recording unit in advance.

Here, in the present description, the processing performed by the computer according to the program does not necessarily have to be performed in time series in the order described as the flowcharts. In other words, the processing performed by the computer according to the program also includes processing executed in parallel or individually (for example, parallel processing or object processing).

Furthermore, the program may be processed by one computer (processor) or may be distributed and processed by a plurality of computers. Moreover, the program may be transferred to a distant computer and executed.

Moreover, in the present description, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Note that an embodiment of the present technology is not limited to the above-described embodiment, and various modifications can be made without departing from the gist of the present technology. For example, the present technology can be configured as cloud computing in which one function is shared and jointly processed by a plurality of devices via a network.

Furthermore, each step in the above-described flowcharts can be executed by one device or shared and executed by a plurality of devices. Moreover, in a case where one step includes a plurality of processing, the plurality of processing included in the one step can be executed by one device or shared and executed by a plurality of devices.

Furthermore, the effects described in the present description are merely examples and are not limited, and there may be other effects.

Note that the present technology can have the following configurations.

(1)

An information processing apparatus including:

a control unit, in which when a captured image captured by an imaging device in one space is displayed in real time by a display device in another space between a first space in which a first imaging device and a first display device are installed and a second space in which a second imaging device and a second display device are installed, the control unit acquires analysis target data obtained from a device installed in at least one of the first space or the second space, analyzes a state of a user by using the acquired analysis target data on the basis of a human visual characteristic, and controls a shape of a display area of the display device on the basis of an analysis result of the state of the user.

(2)

The information processing apparatus according to (1), in which the control unit analyzes a context on the basis of the acquired analysis target data, and controls the shape of the display area on the basis of an analysis result of at least one of the state of the user or the context.

(3)

The information processing apparatus according to (1), in which the control unit analyzes a relative relationship with a partner user on the basis of the acquired analysis target data, and controls the shape of the display area on the basis of an analysis result of at least one of the state of the user or the relative relationship.

(4)

The information processing apparatus according to any one of (1) to (3), in which the control unit changes the shape of the display area from a first shape to a second shape.

(5)

The information processing apparatus according to (4), in which the control unit determines whether to change the shape of the display area from the first shape at a current point of time to the second shape according to the analysis result on the basis of the analysis result of the state of the user, and changes from the first shape to the second shape in a case where it is determined to change from the first shape at the current point of time to the second shape according to the analysis result.

(6)

The information processing apparatus according to any one of (1) to (5), in which the shape of the display area includes any one of a rectangular shape, a circular shape, an elliptical shape, a polygonal shape, and a shape of a predetermined symbol.

(7)

The information processing apparatus according to any one of (1) to (6), in which the control unit analyzes the state of the user by using the analysis target data on the basis of a human field of view characteristic.

(8)

The information processing apparatus according to any one of (1) to (7), in which the control unit analyzes a cognitive state of the user by using the analysis target data, and controls the shape of the display area on the basis of an analysis result of the cognitive state of the user.

(9)

The information processing apparatus according to (8), in which the control unit analyzes a context on the basis of the analysis target data, analyzes an influence on the user caused by the context, and analyzes the cognitive state of the user on the basis of an analysis result of the influence on the user.

(10)

The information processing apparatus according to any one of (1) to (9), in which the control unit analyzes a position of the user by using the analysis target data, and controls the shape of the display area on the basis of an analysis result of the position of the user.

(11)

The information processing apparatus according to (10), in which the control unit sets an initial shape of the display area to a shape corresponding to the position of the user assumed in advance.

(12)

The information processing apparatus according to (4) or (5), in which the control unit continuously changes from the first shape to the second shape when changing the shape of the display area.

(13)

The information processing apparatus according to (4) or (5), in which the control unit changes from the first shape to the second shape by controlling a graphical display or driving a predetermined mechanism when changing the shape of the display area.

(14)

The information processing apparatus according to (7), in which the field of view characteristic includes a discriminative field of view, an effective field of view, and a gaze stable field of view.

(15)

The information processing apparatus according to (4) or (5), in which the control unit changes to the second shape estimated from the analysis target data by using a determination model learned by machine learning that uses learning data regarding the shape of the display area.

(16)

The information processing apparatus according to any one of (1) to (15), in which the device includes the imaging device and a sensor device, and the analysis target data includes captured image data and sensor data.

(17)

The information processing apparatus according to (2) or (9), in which the context includes at least one of information regarding the space, information regarding a climate around the space, or information regarding a building in which the space exists or equipment of the building.

(18)

The information processing apparatus according to any one of (1) to (17), in which the first imaging device and the first display device installed in the first space are integrally formed, and another information processing apparatus in which the second imaging device and the second display device installed in the second space are integrally formed are mutually connected via a network.

(19)

The information processing apparatus according to (18), in which the control unit analyzes a state of a first user in the first space by using the analysis target data on the basis of a human visual characteristic, and controls a shape of a display area of the first display device on the basis of an analysis result of the state of the first user.

(20)

An information processing method in which when an information processing apparatus displays a captured image captured by an imaging device in one space in real time by a display device in another space between a first space in which a first imaging device and a first display device are installed and a second space in which a second imaging device and a second display device are installed, the method including:

acquiring analysis target data obtained from a device installed in at least one of the first space or the second space;

analyzing a state of a user by using the acquired analysis target data on the basis of a human visual characteristic; and controlling a shape of a display area of the display device on the basis of an analysis result of the state of the user.

REFERENCE SIGNS LIST

1 Information processing system
10, 10A, 10B Information processing apparatus
11A, 11B Input/output unit
12A, 12B Home server
20 Server
50 Network
100 Control unit
101 CPU
102 ROM
103 RAM
104 Bus
105 Input/output I/F
106 Input unit
107 Output unit
108 Storage unit
109 Communication unit
111 Operation unit
112 Camera unit
113 Sound collection unit
114 Sensor unit
121 Display unit
122 Sound output unit
131 Data acquisition unit
132 Analysis processing unit
133 Display control unit
141 Drive control unit

The invention claimed is:

1. A first information processing apparatus, comprising:
circuitry configured to:

acquire analysis target data, wherein a first imaging device and a first display device are installed in a first space, a second imaging device and a second display device are installed in a second space, the analysis target data is obtained from a device installed in at least one of the first space or the second space, a first captured image captured by the first imaging device in the first space is displayed in real time by the second display device in the second space, and a second captured image captured by the second imaging device in the second space is displayed in real time by the first display device in the first space;

analyze a state of a user based on the acquired analysis target data, wherein the state of the user is analyzed based on a human visual characteristic; and control a shape of a display area of at least one of the first display device or the second display device based on an analysis result of the analyzed state of the user, wherein the first captured image captured by the first imaging device is displayed in the display area of the second display device, and the second captured image captured by the second imaging device is displayed in the display area of the first display device.

2. The first information processing apparatus according to claim 1, wherein the circuitry is further configured to:

analyze a context based on the acquired analysis target data; and control the shape of the display area based on at least one of the analysis result of the analyzed state of the user or an analysis result of the analyzed context.

3. The first information processing apparatus according to claim 1, wherein the circuitry is further configured to:

analyze a relative relationship of the user with a partner user based on the acquired analysis target data; and control the shape of the display area based on at least one of the analysis result of the analyzed state of the user or an analysis result of the analyzed relative relationship.

4. The first information processing apparatus according to claim 1, wherein the circuitry is further configured to change the shape of the display area from a first shape to a second shape.

5. The first information processing apparatus according to claim 4, wherein the circuitry is further configured to:

determine to change the shape of the display area from the first shape at a current point of time to the second shape based on the analysis result of the analyzed state of the user; and change the shape of the display area from the first shape to the second shape based on the determination to change the shape from the first shape at the current point of time to the second shape.

6. The first information processing apparatus according to claim 1, wherein the shape of the display area includes one of a rectangular shape, a circular shape, an elliptical shape, a polygonal shape, or a shape of a symbol.

7. The first information processing apparatus according to claim 1, wherein the circuitry is further configured to analyze the state of the user by using based on the analysis target data, wherein the state of the user is analyzed based on a human field of view characteristic.

8. The first information processing apparatus according to claim 1, wherein the circuitry is further configured to:

analyze a cognitive state of the user based on the analysis target data; and control the shape of the display area based on an analysis result of the analyzed cognitive state of the user.

9. The first information processing apparatus according to claim 8, wherein the circuitry is further configured to:

analyze a context based on the analysis target data;

analyze an influence on the user caused by the context; and analyze the cognitive state of the user based on an analysis result of the analyzed influence on the user.

10. The first information processing apparatus according to claim 1, wherein the circuitry is further configured to:

analyze a position of the user based on the analysis target data; and control the shape of the display area based on an analysis result of the analyzed position of the user.

11. The first information processing apparatus according to claim 10, wherein the circuitry is further configured to set an initial shape of the display area to a shape corresponding to the position of the user, wherein the shape corresponding to the position of the user is assumed in advance.

12. The first information processing apparatus according to claim 4, wherein the circuitry is further configured to continuously change the shape of the display area from the first shape to the second shape based on the change of the shape of the display area.

13. The first information processing apparatus according to claim 4, wherein the circuitry is further configured to:

control a graphical display or drive a mechanism to change the shape of the display area; and change the shape of the display area from the first shape to the second shape based on the controlled graphical display or the driven mechanism.

14. The first information processing apparatus according to claim 7, wherein the human field of view characteristic includes a discriminative field of view, an effective field of view, and a gaze stable field of view.

15. The first information processing apparatus according to claim 4, wherein the circuitry is further configured to change the shape of the display area to the second shape estimated from the analysis target data, wherein the second shape is estimated based on by using a determination model learned by machine learning, and the machine learning uses learning data regarding the shape of the display area.

16. The first information processing apparatus according to claim 1, wherein the device includes an imaging device and a sensor device, and the analysis target data includes captured image data and sensor data.

17. The first information processing apparatus according to claim 2, wherein the context includes at least one of information regarding one of the first space or the second space, information regarding a climate around one of the first space or the second space, or information regarding a building in which one of the first space or the second space exists or an equipment of the building.

18. The first information processing apparatus according to claim 1, wherein the first imaging device and the first display device installed in the first space are integrally formed in the first information processing apparatus, the second imaging device and the second display device installed in the second space are integrally formed in a second information processing apparatus, and the first information processing apparatus and the second information processing apparatus are mutually connected via a network.

19. The first information processing apparatus according to claim 18, wherein the circuitry is further configured to:

analyze a state of a first user in the first space based on the analysis target data, wherein the state of the first user is analyzed based on the human visual characteristic; and control the shape of the display area of the first display device based on an analysis result of the analyzed state of the first user.

20. An information processing method, comprising:

acquiring analysis target data, wherein a first imaging device and a first display device are installed in a first space, a second imaging device and a second display device are installed in a second space, the analysis target data is obtained from a device installed in at least one of the first space or the second space, a first captured image captured by the first imaging device in the first space is displayed in real time by the second display device in the second space, and a second captured image captured by the second imaging device in the second space is displayed in real time by the first display device in the first space;

analyzing a state of a user based on the acquired analysis target data, wherein the state of the user is analyzed based on a human visual characteristic; and controlling a shape of a display area of at least one of the first display device or the second display device based on an analysis result of the analyzed state of the user, wherein the first captured image captured by the first imaging device is displayed in the display area of the second display device, and the second captured image captured by the second imaging device is displayed in the display area of the first display device.

* * * * *